US012657428B2

(12) United States Patent
Li

(10) Patent No.: US 12,657,428 B2
(45) Date of Patent: Jun. 16, 2026

(54) CONVOLUTION COMPUTATION ENGINE, ARTIFICIAL INTELLIGENCE CHIP, AND DATA PROCESSING METHOD

(71) Applicant: Tencent Technology (Shenzhen) Company Limited, Shenzhen (CN)

(72) Inventor: Jiaxin Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 966 days.

(21) Appl. No.: 17/895,811

(22) Filed: Aug. 25, 2022

(65) Prior Publication Data

US 2023/0026006 A1 Jan. 26, 2023

Related U.S. Application Data

(63) Continuation of application No. PCT/CN2021/102707, filed on Jun. 28, 2021.

(30) Foreign Application Priority Data

Aug. 18, 2020 (CN) .......................... 202010831555.6

(51) Int. Cl.
*G06N 3/04* (2023.01)
*G06N 3/063* (2023.01)

(52) U.S. Cl.
CPC ............... *G06N 3/04* (2013.01); *G06N 3/063* (2013.01)

(58) Field of Classification Search
CPC .................................. G06N 3/04; G06N 3/063
(Continued)

(56) References Cited

U.S. PATENT DOCUMENTS

| | | | | |
|---|---|---|---|---|
| 10,747,502 B2 * | 8/2020 | Pareek | .................... | G06F 7/483 |
| 11,003,985 B2 * | 5/2021 | Kim | ........................ | G06N 3/063 |

(Continued)

FOREIGN PATENT DOCUMENTS

| | | |
|---|---|---|
| CN | 109615067 A | 4/2019 |
| CN | 110163042 A | 8/2019 |

(Continued)

OTHER PUBLICATIONS

Martha Kim, "CSEE 3827: Fundamentals of Computer Systems, Spring 2011", 2011, University of Columbia (Year: 2011).*

(Continued)

*Primary Examiner* — Neveen Abel Jalil
(74) *Attorney, Agent, or Firm* — Morgan, Lewis & Bockius LLP

(57) ABSTRACT

This application discloses a convolution computation engine of a neural network model. The neural network model includes at least first and second network layers. The convolution computation engine includes a weight storage unit implemented by a first processing circuit and a data computation unit implemented by a second processing circuit. The weight storage unit pre-loads weight data of the second network layer from an external storage unit located outside (Continued)

the convolution computation engine during a convolution operation of the first network layer. The data computation unit obtains target input data of the second network layer in response to an operation instruction of the second network layer, and reads the weight data of the second network layer from the weight storage unit; and performs a convolution operation on the target input data by using the weight data of the second network layer.

19 Claims, 13 Drawing Sheets

(58) Field of Classification Search
USPC .......................................................... 706/27
See application file for complete search history.

(56) References Cited

U.S. PATENT DOCUMENTS

| | | | | |
|---|---|---|---|---|
| 11,861,501 | B2 * | 1/2024 | Chen .................... | G06N 3/0455 |
| 11,886,982 | B2 * | 1/2024 | Torudbakken ........ | G06F 9/4887 |
| 12,175,718 | B2 * | 12/2024 | Ma .......................... | G06F 18/22 |
| 2016/0379111 | A1 * | 12/2016 | Bittner, Jr. ............ | G06F 9/3885 |
| | | | | 706/25 |
| 2020/0150958 | A1 * | 5/2020 | Ahmed .................. | G06N 3/063 |
| 2020/0218965 | A1 | 7/2020 | Sankaralingam et al. | |
| 2020/0288205 | A1 * | 9/2020 | Ding .................. | H04N 21/4668 |
| 2021/0182666 | A1 * | 6/2021 | Han ........................ | G06F 17/16 |

FOREIGN PATENT DOCUMENTS

| | | |
|---|---|---|
| CN | 111431536 A | 7/2020 |
| CN | 111465943 A | 7/2020 |
| CN | 111915001 A | 11/2020 |

OTHER PUBLICATIONS

A. Mason, "Memory Basics", 2008, Michigan State (Year: 2008).*
Surkar, A., & Agarwal, V. (2019, June). Delay and power analysis of current and voltage sense amplifiers for SRAM at 180nm technology. In 2019 3rd international conference on electronics, communication and aerospace technology (ICECA) (pp. 1371-1376). IEEE. (Year: 2019).*
Huang, K., Siegel, P. H., & Jiang, A. (May 2020). Functional error correction for robust neural networks. IEEE Journal on Selected Areas in Information Theory, 1(1), 267-276. (Year: 2020).*
Guan, H., Ning, L., Lin, Z., Shen, X., Zhou, H., & Lim, S. H. (2019). In-place zero-space memory protection for cnn. Advances in Neural Information Processing Systems, 32. (Year: 2019).*
Optimizing Weight Mapping and Data Flow for Convolutional Neural Network by Xiaochen Peng et al. (Year: 2019).*
FloatPIM: in-memory acceleration of deep neural network training by Mohsen Imani (Year: 2019).*
Tencent Technology, ISR, PCT/CN2021/102707, Sep. 17, 2021, 3 pgs.
Tencent Technology, WO, PCT/CN2021/102707, Sep. 17, 2021, 6 pgs.
Tencent Technology, IPRP, PCT/CN2021/102707, Feb. 16, 2023, 7 pgs.

* cited by examiner

Neural network model

Weight value

Input

Output

Input layer

Hidden layers
(intermediate layers)

Output layer

11

12

Weight storage unit

Data computation unit

Convolution computation engine

| | |
|---|---|
| Pre-load weight data of the second network layer during a convolution operation of the first network layer | S701 |
| Read target input data of the second network layer in response to an operation instruction for the second network layer | S702 |
| Perform a convolution operation on the target input data by using the weight data of the second network layer | S703 |

CONVOLUTION COMPUTATION ENGINE, ARTIFICIAL INTELLIGENCE CHIP, AND DATA PROCESSING METHOD

CROSS-REFERENCE TO RELATED APPLICATIONS

This application is a continuation application of PCT Patent Application No. PCT/CN2021/102707, entitled "CONVOLUTION CALCULATION ENGINE, ARTIFI-CIAL INTELLIGENCE CHIP, AND DATA PROCESSING METHOD" filed on Jun. 28, 2021, which claims priority to Chinese Patent Application No. 202010831555.6, filed with the State Intellectual Property Office of the People's Republic of China on Aug. 18, 2020, and entitled "CONVOLU-TION COMPUTATION ENGINE, ARTIFICIAL INTELLI-GENCE CHIP, AND DATA PROCESSING METHOD", all of which are incorporated herein by reference in their entirety.

FIELD OF THE TECHNOLOGY

Embodiments of this application relate to the field of Internet technologies, specifically relate to the field of artificial intelligence technologies, and in particular, to a convolution computation engine of a neural network model, and an artificial intelligence chip, and a data processing method.

BACKGROUND OF THE DISCLOSURE

With the development of science and technology, cloud technologies are used in an increasing quantity of industry applications such as related applications of artificial intelligence and related applications of intelligent hardware. A neural network model based on an artificial intelligence technology has been widely used in many emerging fields such as face recognition, image classification, and object labeling. In an application process of the neural network model, the use of a convolution computation engine is generally involved. The convolution computation engine herein refers to an engine for completing a convolution operation in the neural network model. Research shows that the convolution computation engine usually takes over 80% of a calculation amount during calculation of the neural network model. It can be seen that for the neural network model, the convolution computation engine is a relatively critical component. At present, how to improve computation performance of the convolution computation engine becomes a research hotspot.

SUMMARY

Embodiments of this application provide a convolution computation engine, an artificial intelligence chip, and a data processing method, which may implement parallel processing of a convolution operation and weight data loading and improve computation performance of the convolution computation engine.

An embodiment of this application provides a convolution computation engine of a neural network model, the neural network model including at least a first network layer and a second network layer; the convolution computation engine including a weight storage unit and a data computation unit; an output end of the weight storage unit being connected to an input end of the data computation unit; the weight storage unit being implemented by a first processing circuit, the data computation unit being implemented by a second processing circuit, and the first processing circuit and the second processing circuit being independent of each other;

the weight storage unit being configured to pre-load weight data of the second network layer from an external storage unit located outside the convolution computation engine during a convolution operation of the first network layer; and the data computation unit being configured to obtain target input data of the second network layer in response to an operation instruction for the second network layer, and read the weight data of the second network layer from the weight storage unit; and perform a convolution operation on the target input data by using the weight data of the second network layer.

An embodiment of this application further provides an artificial intelligence chip, including at least the convolution computation engine of the neural network model.

According to another aspect, an embodiment of this application provides a data processing method, performed by the convolution computation engine of the neural network model, the neural network model including at least a first network layer and a second network layer, and the convolution computation engine including a weight storage unit and a data computation unit; an output end of the weight storage unit being connected to an input end of the data computation unit; and the data processing method including:

pre-loading weight data of the second network layer during a convolution operation of the first network layer;

reading target input data of the second network layer in response to an operation instruction for the second network layer; and performing a convolution operation on the target input data by using the weight data of the second network layer.

In the embodiments of this application, a weight storage unit and a data computation unit are disposed in a convolution computation engine, so that during a convolution operation of a first network layer of a neural network model, the weight storage unit may pre-load weight data of a second network layer of the neural network model from an external storage unit in parallel. Through parallel processing of the convolution operation and the weight data loading, a loading duration of the weight data may be hidden. Therefore, an entire computation time consumed by the convolution computation engine may be effectively reduced, and the computation performance of the convolution computation engine is improved. In addition, the storage of the weight data may be separated from the data computation unit by disposing an independent weight storage unit. Therefore, weight data of network layers may be pre-loaded by sharing the weight storage unit, to effectively improve a storage integration degree, thereby reducing an area of the convolution computation engine and facilitating production and manufacturing of the convolution computation engine. In addition, the weight storage unit is mainly configured to store the weight data. Therefore, the weight data of the second network layer is pre-loaded to the weight storage unit, so that when reading the weight data of the second network layer from the weight storage unit, the data computation unit may have a relatively accurate data reading range, to further reduce a read duration of the weight data, thereby effectively reducing power consumption of the convolution computation engine.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes technical solutions in embodiments of this application with reference to the accompanying drawings in the embodiments of this application.

Artificial intelligence (AI) is a theory, method, technology, and application system that uses a digital computer or a machine controlled by the digital computer to simulate, extend, and expand human intelligence, perceive an environment, obtain knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making. The artificial intelligence technology is a comprehensive discipline involving a wide range of fields, including a hardware-level technology and a software-level technology. The software level of the artificial intelligence mainly involves related technologies of the neural network model. Correspondingly, the hardware level of the artificial intelligence mainly involves related technologies of hardware devices (for example, convolution computation engines) required for the calculation of the neural network model.

Figure 1A:
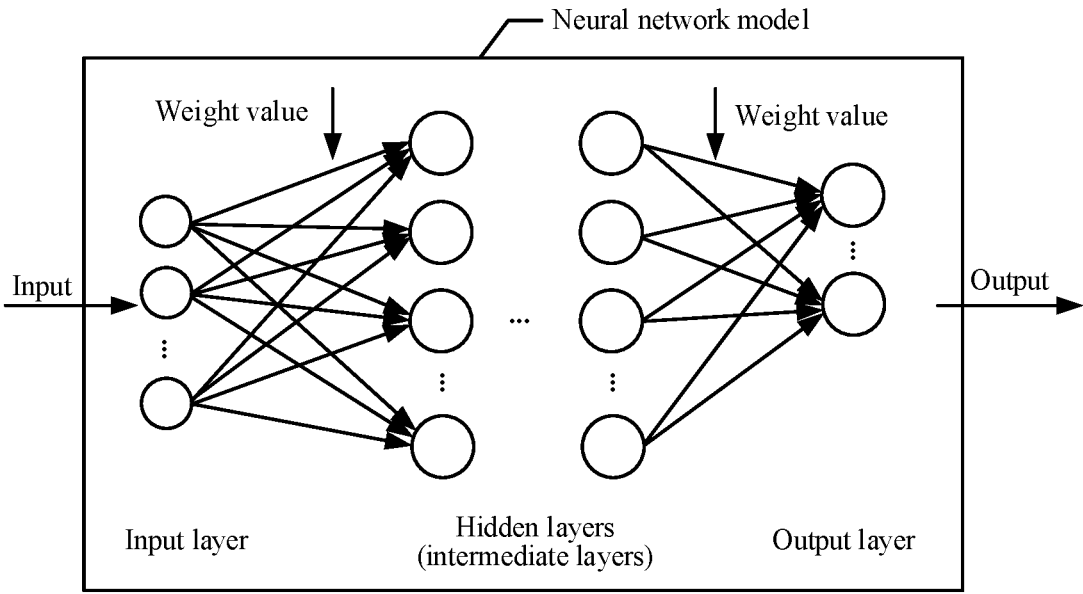
FIG. 1A is a schematic diagram of a model structure of a neural network model according to an embodiment of this application.

The neural network model is a model built by simulating an actual neural network of human and may be a convolutional neural network (CNN) model or a recurrent neural network (RNN) model, or the like. Referring to FIG. 1A, the neural network model may include a plurality of network layers. A network layer configured to receive input data of the neural network model may be referred to as an input layer, a network layer configured to output a processing result of the neural network model may be referred to as an output layer, and all network layers located between the input layer and the output layer may be referred to as hidden layers (or intermediate layers). All the network layers involving a convolution operation in the neural network model have a plurality of corresponding convolution kernels. Each convolution kernel includes one or more corresponding weight values. The weight values of the plurality of convolution kernels may form weight data of the network layers. The weight value is a network parameter. The convolution operation means that sliding window is performed on input data of the network layers by using a plurality of convolution kernels, and a multiply-add operation is performed on the data in the sliding window by using the weight values of the convolution kernels. FIG. 1A only exemplarily shows a model structure of the neural network model, and is not limited thereto.

Figure 1B:
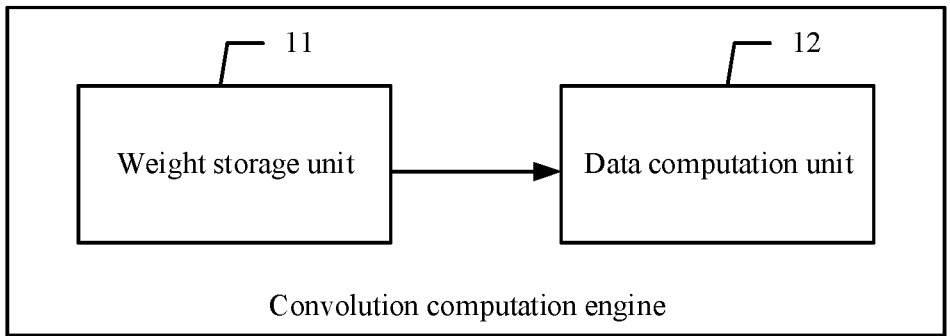
FIG. 1B is a schematic structural diagram of a convolution computation engine of a neural network model according to an embodiment of this application.

Based on the artificial intelligence technology, an embodiment of this application provides a high-performance convolution computation engine of the neural network model. The input data of the neural network model may be k-dimensional data (k is a positive integer), which may specifically include, but not limited to, image data, text data, language data, and the like. The neural network model may include at least a first network layer and a second network layer. The first network layer may be any network layer involving the convolution operation other than the output layer in the neural network model. The second network layer may be any network layer involving the convolution operation and located after the first network layer in the neural network model. The convolution computation engine of the neural network model may mainly include a weight storage unit 11 and a data computation unit 12. An output end of the weight storage unit 11 is connected to an input end of the data computation unit 12, as shown in FIG. 1B. The weight storage unit 11 may rapidly pre-load weight data of one or more network layers in the neural network model, to achieve maximum computation utilization. The data computation unit 12 is a core of the convolution computation engine and may flexibly support a plurality of convolution operations of different calculation formats with relatively strong university. The weight storage unit 11 is implemented by a first processing circuit, the data computation unit 12 is implemented by a second processing circuit, and the first processing circuit and the second processing circuit are independent of each other.

In some embodiments, the weight storage unit 11 may be configured to pre-load weight data of the second network layer from an external storage unit located outside the convolution computation engine during a convolution operation of the first network layer. The weight data of the second network layer may include N weight values, and N is a positive integer. In an implementation, the weight storage unit 11 may include one or more micro memories. Therefore, in this implementation, the weight storage unit 11 may store the weight data of the second network layer by using the one or more micro memories. In another implementation, the weight storage unit 11 may include one or more storage arrays. Each of the storage arrays is an array obtained by arranging a plurality of storage units in a form of a matrix. Therefore, in this implementation, the weight storage unit 11 may store the weight data of the second network layer by using the one or more storage arrays. When a memory of the weight storage unit 11 is sufficient, the weight storage unit 11 may further pre-load weight data of another network layer that does not perform a convolution operation in addition to pre-loading the weight data of the second network layer during the convolution operation of the first network layer.

The data computation unit 12 may be configured to obtain target input data of the second network layer in response to an operation instruction for the second network layer, and read the weight data of the second network layer from the weight storage unit; and perform a convolution operation on the target input data by using the weight data of the second network layer. The operation instruction for the second network layer may be generated by an external engine located outside the convolution computation engine or may be generated by the convolution computation engine after a convolution operation of an adjacent network layer of the second network layer is completed. This is not limited. The target input data of the second network layer is operation result data of the adjacent network layer obtained after the convolution operation of the adjacent network layer of the second network layer is completed. The target input data may be k-dimensional data, that is, the target input data may be two-dimensional data, three-dimensional data, or the like. For ease of description, an example in which the target input data is the three-dimensional data is used below for description. The adjacent network layer of the second network layer is a network layer that is adjacent to the second network layer and is located before the second network layer in the neural network model. For example, it is assumed that the first network layer is an input layer (that is, a first network layer) of the neural network model. If the second network layer is a second network layer in the neural network model, the adjacent network layer of the second network layer is the first network layer. If the second network layer is a third network layer in the neural network model, the adjacent network layer of the second network layer is a second network layer.

The convolution computation engine provided in this embodiment of this application may further include another unit such as a data buffering unit in addition to including the weight storage unit 11 and the data computation unit 12. The data buffering unit may be configured to buffer operation result data of network layers in the neural network model, that is, the data buffering unit may be configured to buffer the operation result data (that is, the target input data of the second network layer) of the adjacent network layer of the second network layer. In this case, the data computation unit 12 may be configured to obtain the target input data of the second network layer from the data buffering unit in response to the operation instruction for the second network layer. It is to be understood that if no data buffering unit is deployed in the convolution computation engine, the operation result data of the network layers in the neural network model may be buffered in an external storage unit located outside the convolution computation engine, that is, the operation result data (that is, the target input data of the second network layer) of the adjacent network layer of the second network layer may be buffered in the external storage unit. Therefore, in this case, the data computation unit 12 may be configured to obtain the target input data of the second network layer from the external storage unit in response to the operation instruction for the second network layer.

In this embodiment of this application, a weight storage unit and a data computation unit are disposed in a convolution computation engine, so that during a convolution operation of a first network layer of a neural network model, the weight storage unit may pre-load weight data of a second network layer of the neural network model from an external storage unit in parallel. Through parallel processing of the convolution operation and the weight data loading, a loading duration of the weight data may be hidden. Therefore, an entire computation time consumed by the convolution computation engine may be effectively reduced, and the computation performance of the convolution computation engine is improved. In addition, the storage of the weight data may be separated from the data computation unit by disposing an independent weight storage unit. Therefore, weight data of network layers may be pre-loaded by sharing the weight storage unit, to effectively improve a storage integration degree, thereby reducing an area of the convolution computation engine and facilitating production and manufacturing of the convolution computation engine. In addition, the weight storage unit is mainly configured to store the weight data. Therefore, the weight data of the second network layer is pre-loaded to the weight storage unit, so that when reading the weight data of the second network layer from the weight storage unit, the data computation unit may have a relatively accurate data reading range, to further reduce a read duration of the weight data, thereby effectively reducing power consumption of the convolution computation engine.

Figure 2:
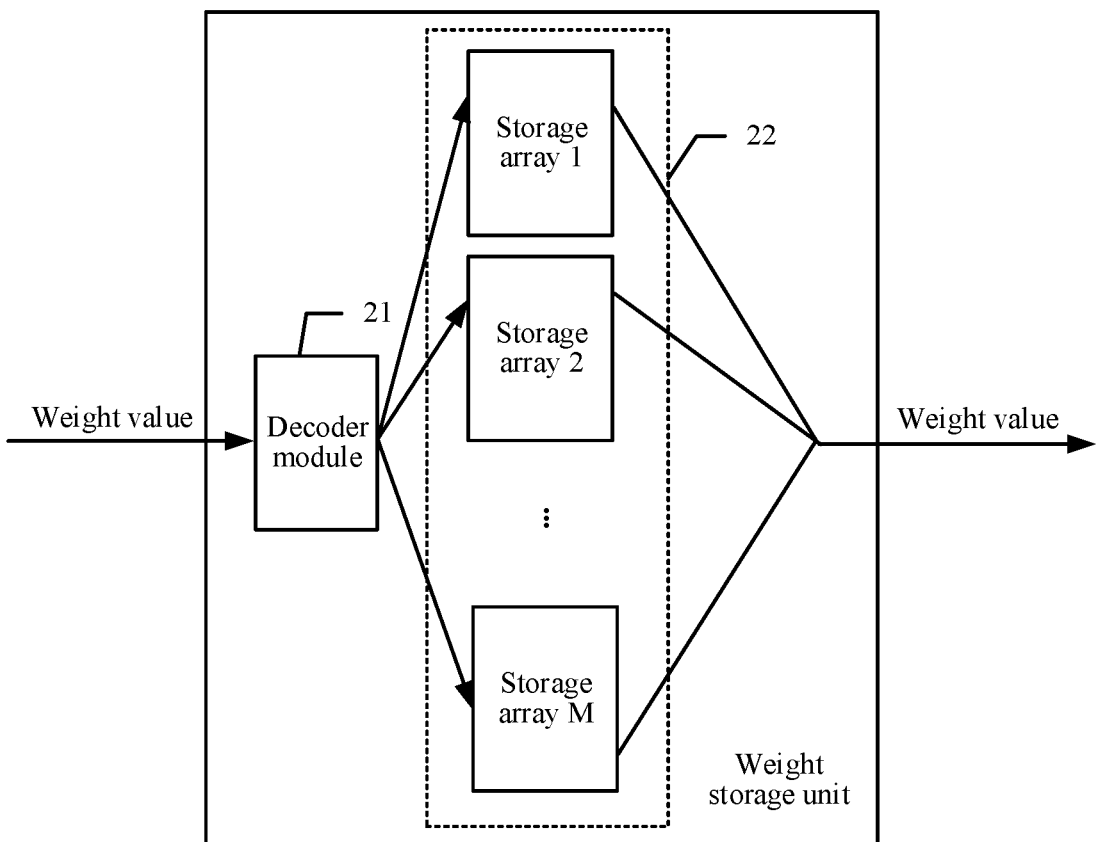
FIG. 2 is a schematic structural diagram of a weight storage unit according to an embodiment of this application.

Based on the related description of the convolution computation engine shown in FIG. 1B, an embodiment of this application provides a weight storage unit shown in FIG. 2. The weight storage unit may be configured to implement operations such as initialization, pre-loading, and output on the weight data of the network layers in the neural network model. Referring to FIG. 2, the weight storage unit may include a decoder module 21 (that is, a decoder module) and M storage arrays 22, M being a positive integer. The decoder module 21 may be respectively connected to input ends of the storage arrays. The decoder module 21 is configured to perform weight value read and write operations on the M storage arrays 22 and may be configured to perform initialization processing on the M storage arrays 22. Correspondingly, the M storage arrays 22 may be configured to store the weight data of the network layers. Each storage array is an array obtained by arranging a plurality of storage units in a form of a matrix. The plurality of storage units in each storage array may be independent of each other, and each storage unit may be an on-chip memory.

A specific principle of performing the weight value read and write operations on the decoder module 21 is described below by using an example in which the neural network model includes the first network layer and the second network layer and the weight data of the second network layer includes the weight values of the N convolution kernels.

1. The specific principle of performing a weight value write operation is that: the decoder module 21 may be configured to obtain the weight data of the second network layer from the external storage unit during the convolution operation of the first network layer; determine storage addresses of the weight values in the weight data of the second network layer in the M storage arrays 22; and respectively write the weight values into the M storage arrays 22 in sequence according to the storage addresses of the weight values. A storage address of any weight value in the weight data of the second network layer may include at least an array identifier of a storage array configured to store any weight value and storage coordinates of a storage unit configured to store the weight value in the storage array.

2. The specific principle of performing a weight value read operation is that: the decoder module 21 may be configured to obtain storage addresses of the weight values in the weight data of the second network layer in the M storage arrays 22 in response to a weight read instruction of the second network layer; and respectively read the weight values from the M storage arrays 22 according to the storage addresses of the weight values, and transmit the read weight values into the data computation unit. The weight read instruction may be transmitted by the data computation unit in the convolution computation engine to the decoder module in the weight storage unit in response to the operation instruction for the second network layer.

In an implementation, the decoder module 21 may include one decoder. In this implementation, the operations (for example, an operation of determining the storage address and read and write operations on the weight values) performed by the decoder module 21 may be all performed by the decoder.

In another implementation, the decoder module 21 may include a plurality of decoders. In this implementation, the operations performed by the decoder module 21 may be respectively performed by the plurality of decoders. For example, referring to FIG. 3A, the decoder module 21 may specifically include: a first decoder 211 (that is, an ID decoder), a second decoder 212, and an access controller 213 (that is, an access timing generator). An input end of the second decoder 212 is connected to an output end of the first decoder 211, and an output end of the second decoder 212 is connected to the access controller 213. The first decoder 211 may be configured to decode an array identifier of a storage array. The second decoder 212 may be configured to decode storage coordinates of a storage unit in the storage array. The access controller 213 may be configured to generate access timing of the M storage arrays. The access timing includes at least one of the following: initialization timing, read and write control and switch timing, write timing, read timing, or error processing timing. The initialization timing is used for triggering an initialization operation on the M storage arrays. The read and write control and switch timing is used for triggering switching from a read mode to a write mode or triggering switching from a write mode to a read mode. The write timing is used for triggering the weight value write operation on the M storage arrays.

The read timing is used for triggering the weight value read operation on the M storage arrays. The error processing timing is used for triggering error processing (that is, data correction) on the weight values read from the M storage arrays.

Figure 3A:
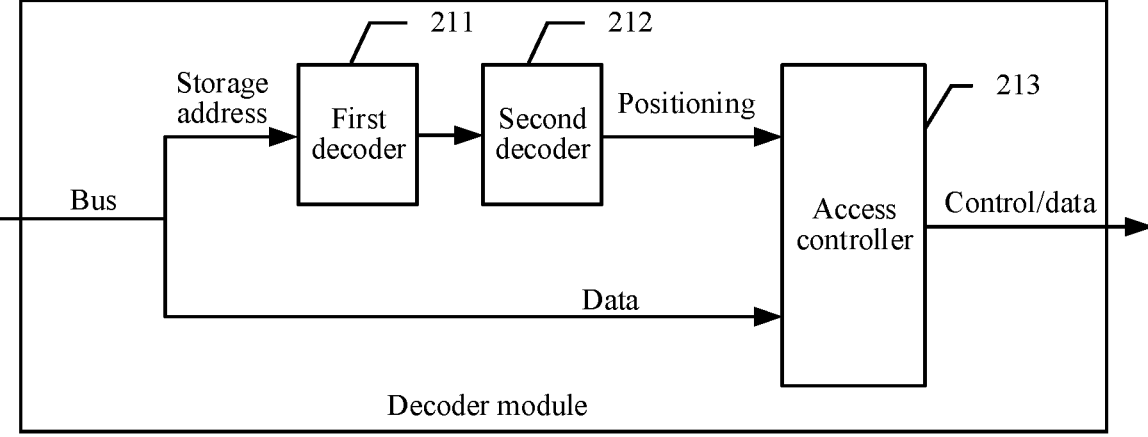
FIG. 3A is a schematic structural diagram of a decoder module in a weight storage unit according to an embodiment of this application.

A specific principle in which the decoders in the decoder module 21 shown in FIG. 3A collaboratively perform the weight value read and write operations is described below by using an example of a target weight value of an $n^{th}$ convolution kernel ($n \in [1, N]$) in the weight data of the second network layer, where the target weight value is any weight value in the $n^{th}$ convolution kernel, and a storage address of the target weight value in the M storage arrays includes an array identifier of a target storage array configured to store the target weight value and storage coordinates of a target storage unit configured to store the target weight value in the target storage array.

1. The specific principle of collaboratively performing a weight value read operation is that: the first decoder 211 may be configured to select the target storage array configured to store the target weight value from the M storage arrays and determine the array identifier of the target storage array; the second decoder 212 may be configured to select the target storage unit configured to store the target weight value from the target storage array and determine the storage coordinates of the target storage unit; and the access controller 213 may be configured to obtain the target weight value from the external storage unit during the convolution operation of the first network layer; and write the target weight value into the target storage unit in the target storage array according to the array identifier corresponding to the target weight value and the storage coordinates corresponding to the target weight value.

2. The specific principle of collaboratively performing a weight value read operation is that: the first decoder 211 is configured to decode the storage address corresponding to the target weight value in response to the weight read instruction of the second network layer, to obtain the array identifier of the target storage array configured to store the target weight value; the second decoder 212 may be configured to decode the storage address corresponding to the target weight value, to obtain the storage coordinates of the target storage unit configured to store the target weight value in the target storage array; and the access controller 213 may be configured to determine the target storage array from the M storage arrays according to the array identifier corresponding to the target weight value; and read the target weight value from the target storage unit in the target storage array according to the storage coordinates corresponding to the target weight value, and transmit the read target weight value into the data computation unit.

In an exemplary implementation, after reading the target weight value from the target storage array, the access controller 213 is further configured to: perform error processing on the read target weight value when the read target weight value is abnormal. That the read target weight value is abnormal means that the read target weight value is different from the written target weight value. Correspondingly, the error processing means that data correction is performed on the read target weight value by using a parity bit corresponding to the target weight value. The parity bit corresponding to the target weight value is generated when the target weight value is written into the target storage array.

Figure 3B:
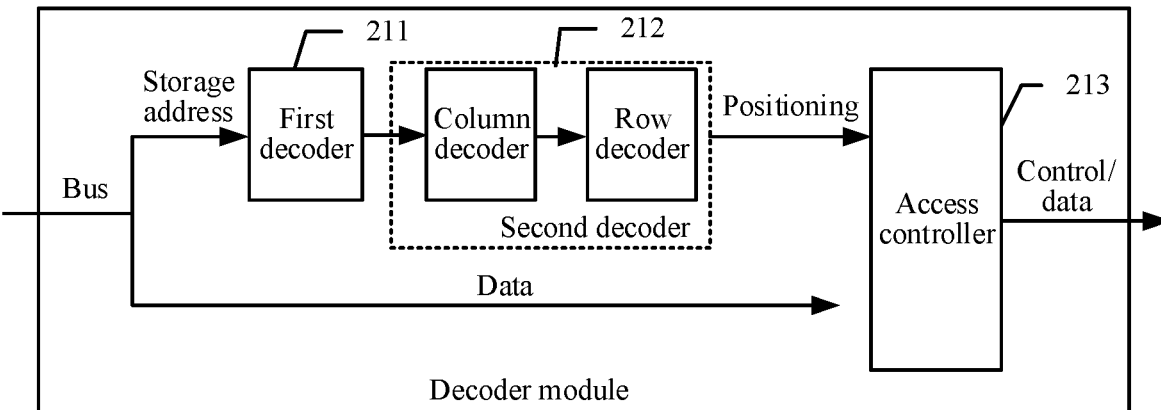
FIG. 3B is a schematic structural diagram of a decoder module in another weight storage unit according to an embodiment of this application.

In another exemplary implementation, the second decoder 212 may include only one coordinate decoder. The coordinate decoder may be configured to decode row coordinates and column coordinates in the storage coordinates of the storage units in the storage arrays. Alternatively, the second decoder 212 may include two decoders, which is specifically a column decoder (that is, a column decoder) and a row decoder (that is, a row decoder). The column decoder may be configured to decode column coordinates in the storage coordinates of the storage units in the storage arrays. The row decoder may be configured to decode row coordinates in the storage coordinates of the storage units in the storage arrays. In this implementation, a specific schematic structural diagram of the decoder module may further be shown in FIG. 3B. FIG. 3B only exemplarily shows a connection relationship among the decoders in the decoder module, which is not limited. For example, in FIG. 3B, an input end of the column decoder is connected to an output end of the first decoder 211, an output end of the column decoder is connected to an input end of the row decoder, and an output end of the row decoder is connected to an input end of the access controller 213. However, in another embodiment, there may alternatively be the following connection relationship: an input end of the row decoder is connected to an output end of the first decoder 211, an output end of the row decoder is connected to an input end of the column decoder, and an output end of the column decoder is connected to an input end of the access controller 213.

In this embodiment of this application, parallel processing of the convolution operation and the weight data loading may be implemented by deploying the weight storage unit in the convolution computation engine, to hide the loading duration of the weight data. Further, the entire computation time consumed by the convolution computation engine may be effectively reduced, and the computation performance of the convolution computation engine is improved. In addition, the weight storage unit stores the weight data of the network layers by reusing a plurality of storage arrays, to effectively improve the storage integration degree, thereby reducing the area of the convolution computation engine and facilitating production and manufacturing of the convolution computation engine.

Based on the related description of the convolution computation engine shown in FIG. 1B, an embodiment of this application further provides a more specific data computation unit. The data computation unit may include H computation arrays, H being a positive integer. Each computation array may be configured to receive externally inputted data and obtain the weight data of the network layers from the weight storage unit in the convolution computation engine, to implement a high-speed convolution operation. Therefore, correspondingly, the data computation unit is configured to obtain target input data of the second network layer in response to an operation instruction for the second network layer, and read the weight data of the second network layer from the weight storage unit; and perform a convolution operation on the target input data by using the weight data of the second network layer. Some or all computation arrays of the H computation arrays may perform the convolution operation on the target input data of the second network layer.

In a specific implementation, any computation array of the H computation arrays may obtain the target input data of the second network layer in response to the operation instruction for the second network layer, and read the weight data of the second network layer from the weight storage unit; and perform a convolution operation on the target input data by using the weight data of the second network layer.

Figure 4A:
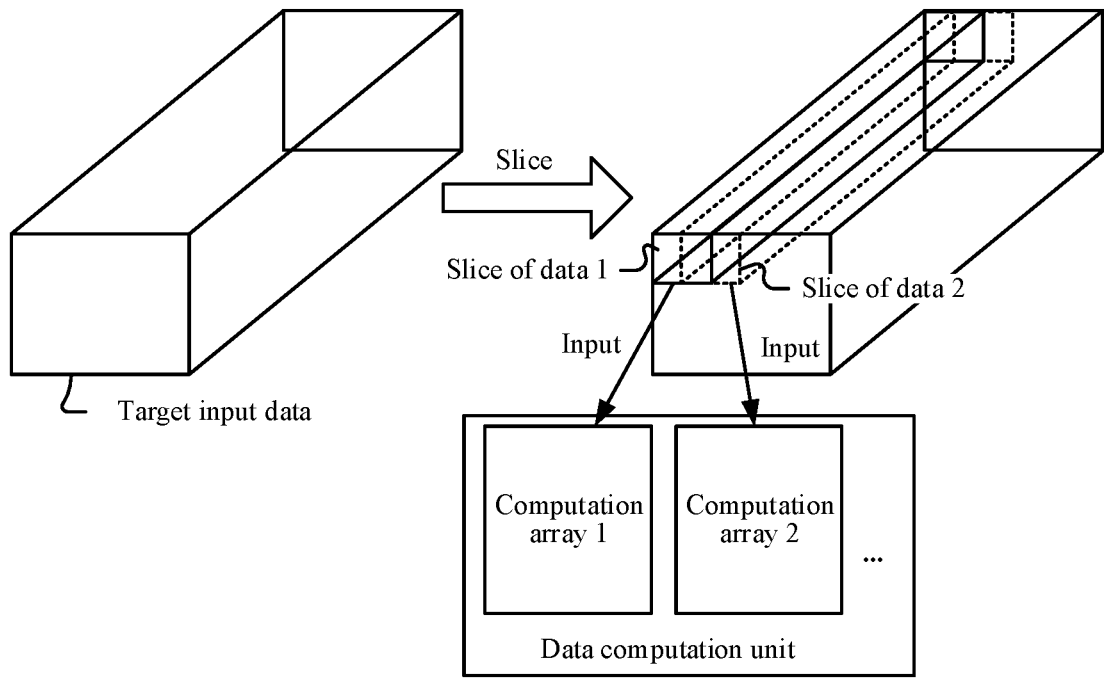
FIG. 4A is a schematic diagram of a slice of target input data according to an embodiment of this application.

In another specific implementation, the target input data may be split into a plurality of slices of data. In this implementation, some or all computation arrays of the H computation arrays may perform convolution calculation on the plurality of slices of data in parallel, one computation array corresponding to one slice of data. For example, referring to FIG. 4A, it is assumed that the target input data is three-dimensional data, the target input data may be split into a plurality of slices of data according to a size of a convolution kernel corresponding to a weight value. A size of each slice of data is less than or equal to the size of the convolution kernel corresponding to the weight value. Subsequently, different computation arrays may be distributed to different slices of data. For example, a slice of data 1 corresponds to a computation array 1 and a slice of data 2 corresponds to a computation array 2. In this implementation, an $h^{th}$ computation array is configured to obtain a target slice of data of the target input data of the second network layer in response to the operation instruction for the second network layer and read the weight data of the second network layer from the weight storage unit; and perform a convolution operation on the target slice of data by using the weight data of the second network layer, $h\in[1, H]$, and the target slice of data being any slice of data on which the convolution operation is not performed on the target input data. In this embodiment of this application, parallel calculation is performed on the plurality of slices of data of the target input data by using the plurality of computation arrays, to effectively improve calculation efficiency of the target input data.

Figure 4B:
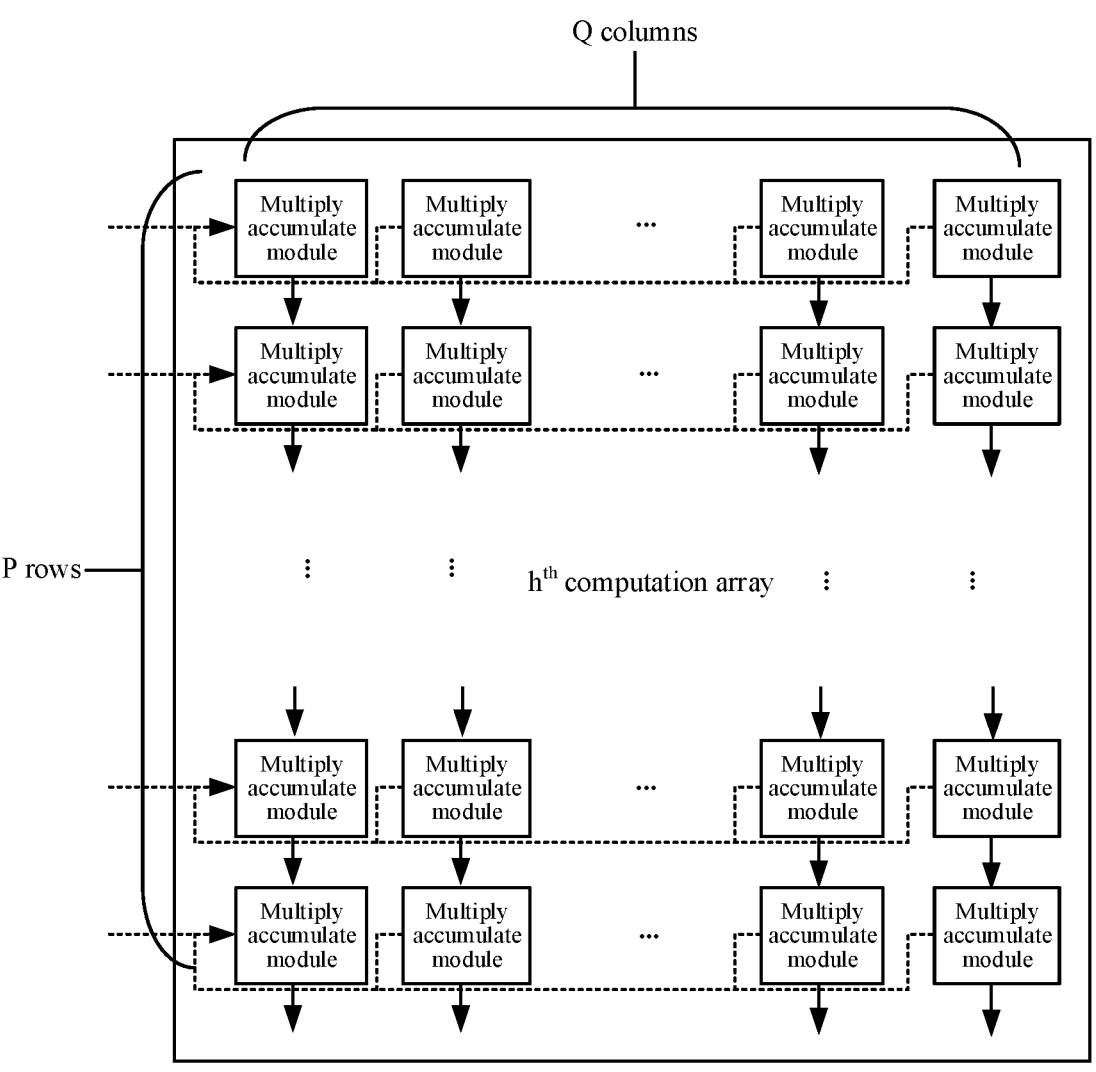
FIG. 4B is a schematic structural diagram of an $h^{th}$ computation array according to an embodiment of this application.

Referring to FIG. 4B, the $h^{th}$ computation array may be an array of P rows and Q columns formed by P*Q multiply accumulate modules, both P and Q being positive integers. The multiply accumulate module may also be referred to as a multiplier accumulator and is a minimum unit in a computation array. The multiply accumulate module is specifically a hardware circuit unit configured to implement multiply accumulate (MAC), that is, the multiply accumulate module is mainly configured to complete multiply accumulate. Specifically, the multiply accumulate module may include at least a first input end A, a second input end B, an upper-level input end C_in, and a module output end C_out. Correspondingly, the multiply accumulate performed by the multiply accumulate module means that after data inputted by the first input end A of the multiply accumulate module is multiplied by data inputted by the second input end B, the obtained product is added to data inputted by the upper-level input end C_in. In the $h^{th}$ computation array, adjacent multiply accumulate modules in the same column are cascaded level by level. That is, a module output end of a multiply accumulate module in a $p^{th}$ row and a $q^{th}$ column is connected to an upper-level input end of a multiply accumulate module in a $(p+1)^{th}$ row and the $q^{th}$ column, $p\in[1, P-1]$ and $q\in[1, Q]$. An intermediate accumulated result obtained by the former multiply accumulate module may be transferred downward to an input end of a multiply accumulate module in the same column in a the latter row in the level-by-level cascading manner. For multiply accumulate modules in a first row in the $h^{th}$ computation array, because there are no inputted intermediate accumulated results in upper-level input ends C_in, when performing multiply and accumulate, the multiply accumulate modules in the first row may perform only a step of multiplying data inputted by first input ends A of the multiply accumulate modules by data inputted by second input ends B, and then directly transfer the products to upper-level input ends C_in of corresponding multiply accumulate modules in a second row.

Figure 4C:
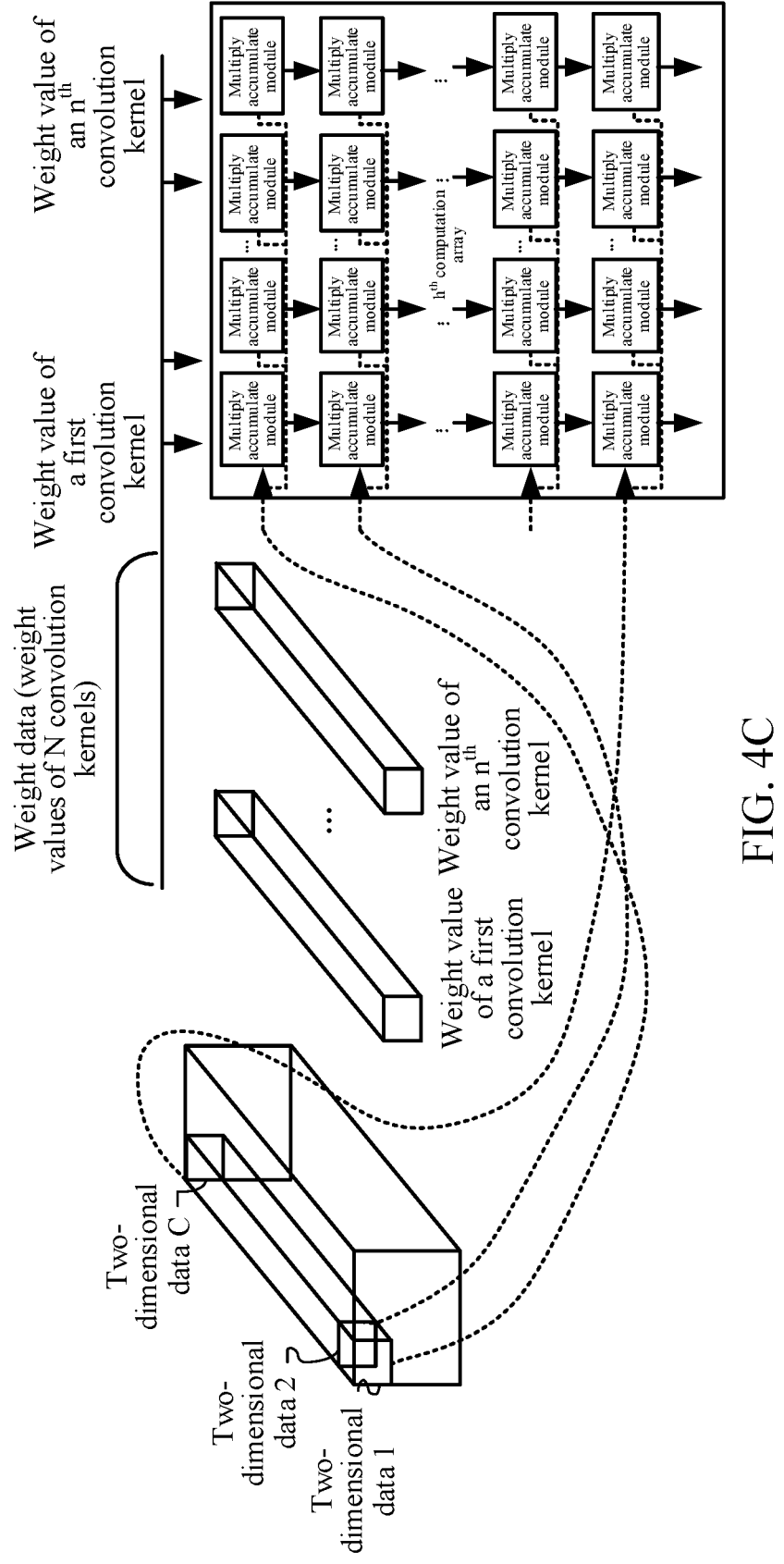
FIG. 4C is a schematic diagram of inputting a target slice of data into an $h^{th}$ computation array according to an embodiment of this application.

Correspondingly, a manner of inputting the target slice of data into the $h^{th}$ computation array is as follows: the target slice of data may be divided into a plurality of pieces of two-dimensional data (activation) according to a depth of the target slice of data if the target slice of data is three-dimensional data. For example, if the depth of the target slice of data is C, the target slice of data may be divided into C pieces of two-dimensional data according to the depth. Any two-dimensional data is inputted into first input ends of multiply accumulate modules in any row in the $h^{th}$ computation array in a broadcast manner. When the weight data of the second network layer includes the weight values of the N convolution kernels, N being a positive integer and N being less than or equal to Q, a weight value of an $n^{th}$ convolution kernel is inputted into second input ends of multiply accumulate modules in an $n^{th}$ column in the $h^{th}$ computation array. For example, it is assumed that the target slice of data is a slice of data 1 and the depth C of the target slice of data is the same as a quantity P of rows of the $h^{th}$ computation array, and it is assumed that a quantity N of convolution kernels corresponding to the weight values included in the weight data of the second network layer is equal to a quantity Q of columns of the $h^{th}$ computation array. The two-dimensional data corresponding to the target slice of data may be simultaneously inputted into first input ends of multiply accumulate modules in the rows in the $h^{th}$ computation array in the broadcast manner, as shown in dotted lines in FIG. 4C. The weight values of the convolution kernels in the second network layer may be respectively inputted into second input ends of multiply accumulate modules in the columns in the $h^{th}$ computation array.

Further, data (for example, the two-dimensional data corresponding to the target slice of data and the weight values) inputted into the multiply accumulate modules may be a fixed-point number or a floating-point number. The fixed-point number is a representation method, of a number used in a computer, for agreeing that decimal point positions of all data in a computer are fixed. Two simple agreements are generally used in a computer: fixing a position of a decimal point before the highest bit of data, or fixing a position of a decimal point after the lowest bit of data. Generally, the former is often referred to as a fixed-point decimal, and the latter is often referred to as a fixed-point integer. The floating-point number is a representation method of another number used in a computer, which is similar to scientific notation. Any binary number N may always be written as: $Y=2^E*X$. In the formula, X is a decimal part (also referred to as mantissa) of the floating-point number Y, and is a pure decimal. E is an exponent part (also referred to as an exponent) of the floating-point number Y, and is an integer. This representation method is equivalent to that a decimal point position of a number may float freely with different scale factors within a specific range, and therefore, is referred to as a floating-point identification method. Correspondingly, an operation of performing a multiplication operation on two floating-point numbers may be referred to as a floating-point multiplication operation. A specific operation principle thereof is as follows: it is assumed that a first floating-point number is $Y_1=2^{E_1}*X_1$ and a second floating-point number is $Y_2=2^{E_2}*X_2$, a product of the two floating-point numbers is $Y_1*Y_2=2^{(E_1+E_2)}*(X_1*X_2)$.

Figure 4D:
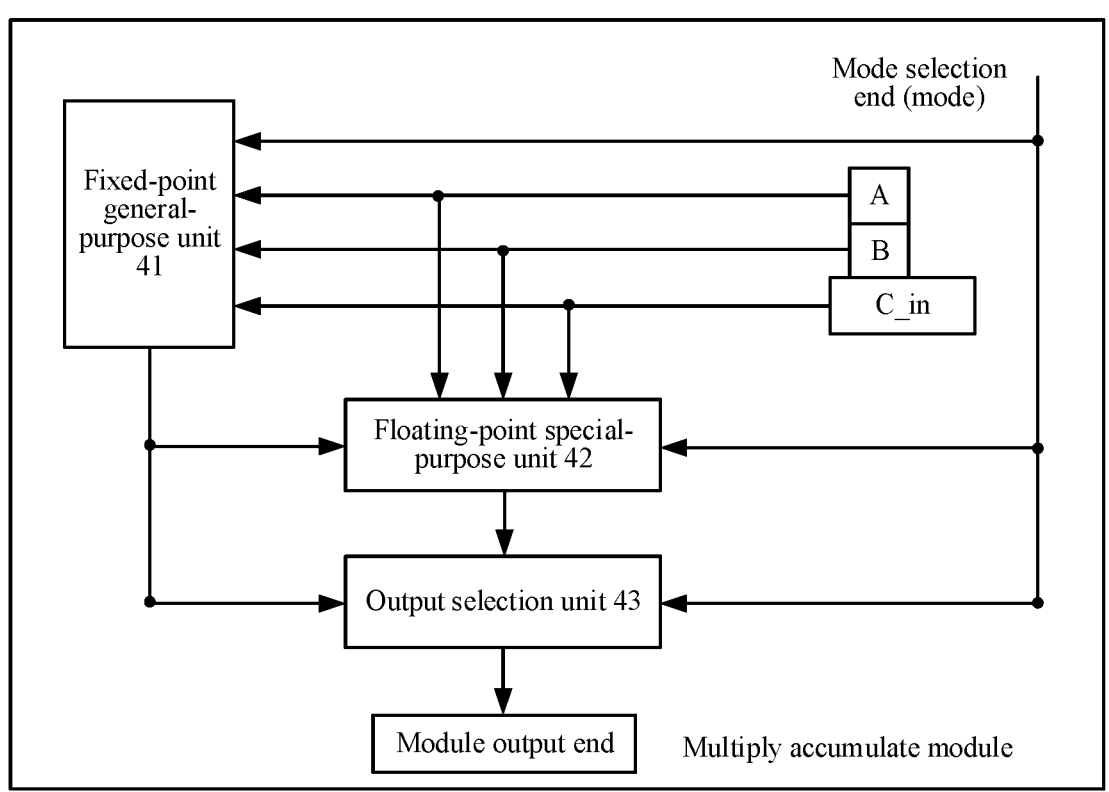
FIG. 4D is a schematic structural diagram of a multiply accumulate module according to an embodiment of this application.

Therefore, to enable the multiply accumulate module to support both a fixed-point operation (that is, a fixed-point number operation), and a floating-point operation (that is, a floating-point number operation), the multiply accumulate module provided in this embodiment of this application may further include: a mode selection end mode configured to select a fixed-point arithmetic mode or a floating-point arithmetic mode, a fixed-point general-purpose unit 41, a floating-point special-purpose unit 42, and an output selection unit 43, as shown in FIG. 4D. The fixed-point general-purpose unit 41 is respectively connected to the first input end A, the second input end B, the upper-level input end C, and the mode selection end mode of the multiply accumulate module. A fixed-point output end of the fixed-point general-purpose unit 41 is respectively connected to the output selection unit 43 and the floating-point special-purpose unit 42. The floating-point special-purpose unit 42 is respectively connected to the first input end A, the second input end B, the upper-level input end C, the fixed-point output end, and the mode selection end mode of the multiply accumulate module. A floating-point output end of the floating-point special-purpose unit 42 is connected to the output selection unit 43. The output selection unit 43 is configured to connect the fixed-point output end to the module output end C_out when an arithmetic mode indicated by the mode selection end mode is the fixed-point arithmetic mode; and connect the floating-point output end to the module output end C_out when the arithmetic mode is the floating-point arithmetic mode. In a specific implementation, a working principle of the multiply accumulate module shown in FIG. 4D is as follows.

When the arithmetic mode is the fixed-point arithmetic mode, the fixed-point general-purpose unit 41 is configured to: multiply two-dimensional data inputted by the first input end A by a weight value inputted by the second input end B, then add an intermediate accumulated result inputted by the upper-level input end C_in, and output a fixed-point operation result from the fixed-point output end. In this case, the output selection unit 43 may connect the fixed-point output end of the fixed-point general-purpose unit 41 to the module output end C_out, and output the fixed-point operation result from the module output end C_out.

When the arithmetic mode is the floating-point arithmetic mode, the fixed-point general-purpose unit 41 is configured to: perform calculation of a multiplication part in a floating-point multiply accumulate operation on the two-dimensional data inputted by the first input end A and the weight value inputted by the second input end B, and output a first intermediate result from the fixed-point output end of the fixed-point general-purpose unit 41. The first intermediate result is inputted to the floating-point special-purpose unit 42. The floating-point special-purpose unit 42 is configured to: perform an operation of an addition part in the floating-point multiply accumulate operation on the two-dimensional data inputted by the first input end A, the weight value inputted by the second input end B, the intermediate accumulated result inputted by the upper-level input end C_in, and the first intermediate result inputted by the fixed-point output end of the fixed-point general-purpose unit 41, and then output a floating-point operation result from the floating-point output end. In this case, the output selection unit 43 connects the floating-point output end of the floating-point special-purpose unit 42 to the module output end C_out, and outputs the floating-point operation result from the module output end C_out.

Figure 4E:
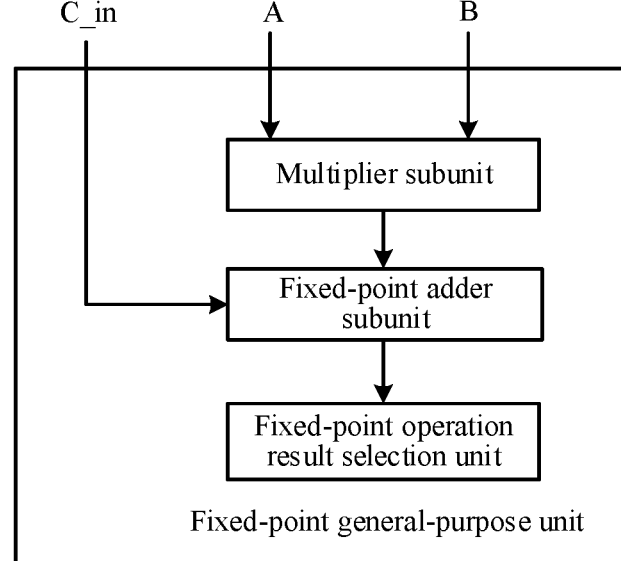
FIG. 4E is a schematic structural diagram of a fixed-point general-purpose unit according to an embodiment of this application.

In an implementation, for a specific structure of the fixed-point general-purpose unit 41 in the multiply accumulate module, reference may further be made to FIG. 4E. Specifically, the fixed-point general-purpose unit 41 may include a multiplier subunit, a fixed-point adder subunit, and a fixed-point operation result selection unit. An input end of the multiplier subunit is respectively connected to the first input end A and the second input end B, an input end of the fixed-point adder subunit is respectively connected to an output end of the multiplier subunit and the upper-level input end C_in, an input end of the fixed-point operation result selection unit is connected to an output end of the fixed-point adder subunit, and an output end of the fixed-point operation result selection unit is connected to the output selection unit 43.

Further, the multiplier subunit may specifically include: a first multiplier, a second multiplier, a third multiplier, and a fourth multiplier. The fixed-point adder subunit may include: a first adder, a second adder, a third adder, and a fourth adder. The first input end A may be split into a first sub input end A1 and a first sub input end A2, the second input end B may be split into a second sub input end B1 and a second sub input end B2, and the upper-level input end C_in may be split into an upper-level sub input end C1 and an upper-level sub input end C2. Correspondingly, for a connection relationship among parts of the fixed-point general-purpose unit 41, reference may be made to FIG. 4F. Details are as follows.

An input end of the first multiplier is respectively connected to the first sub input end A1 and the second sub input end B1. An input end of the second multiplier is respectively connected to the first sub input end A2 and the second sub input end B1. An input end of the third multiplier is respectively connected to the first sub input end A1 and the second sub input end B2. An input end of the fourth multiplier is respectively connected to the first sub input end A2 and the second sub input end B2. An input end of the first adder is respectively connected to an output end of the first multiplier and an output end of the second multiplier. An input end of the second adder is respectively connected to an output end of the third multiplier and an output end of the fourth multiplier. An input end of the third adder is respectively connected to an output end of the first adder, an output end of the fourth adder, and the upper-level sub input end C1. An input end of the fourth adder is respectively connected to the output end of the first adder, the output end of the second adder, the upper-level sub input end C2, the first input end A, and the second input end B. The input end of the fixed-point operation result selection unit is respectively connected to the output end of the third adder and the output end of the fourth adder.

Figure 4F:
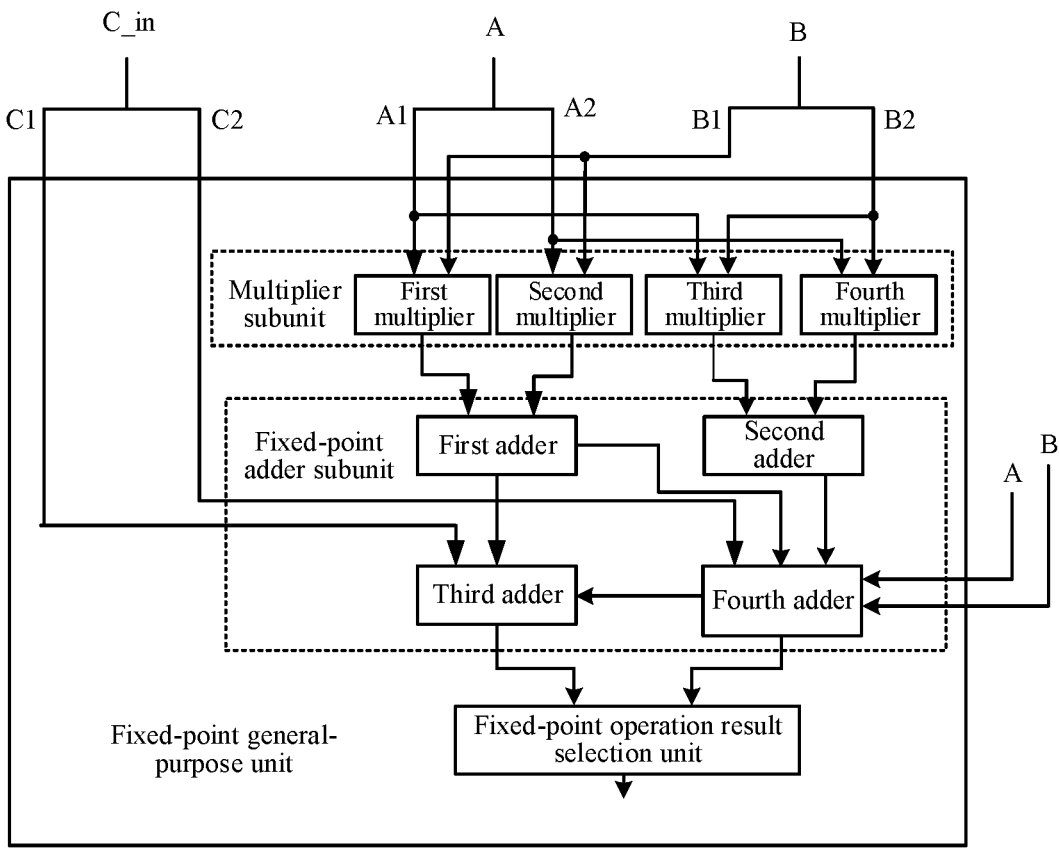
FIG. 4F is a schematic structural diagram of another fixed-point general-purpose unit according to an embodiment of this application.

During actual calculation, when the arithmetic mode is the floating-point arithmetic mode, a specific manner of calculating the first intermediate result by using the fixed-point general-purpose unit 41 shown in FIG. 4F is as follows: a decimal part $S_1X_1$ of the two-dimensional data $S_1 2^{E_1}.X_1$ and a decimal part $S_2X_2$ of the weight value $S_2 2^{E_2}.X_2$ are respectively inputted into the first multiplier, the second multiplier, the third multiplier, or the fourth multiplier by using the first input end A and the second input end B. A product of the decimal part $S_1X_1$ of the two-dimensional data and the decimal part $S_2X_2$ of the weight value is calculated by using the first multiplier, the second multiplier, the third multiplier, or the fourth multiplier, to obtain the first intermediate result. In some embodiments, the fourth adder of the fixed-point general-purpose unit 41 may further calculate a first exponential sum of exponent parts of the two-dimensional data and the weight value and transfer the calculated first exponential sum to the floating-point special-purpose unit 42. Specifically, the exponent part $E_1$ of the two-dimensional data $S_1 2^{E_1}.X_1$ and the exponent part $E_2$ of the weight value $S_2 2^{E_2}.X_2$ may be respectively inputted into the fourth adder by using the first input end A and the second input end B, and the first exponential sum $E_1+E_2$ is calculated by using the fourth adder.

Figure 4G:
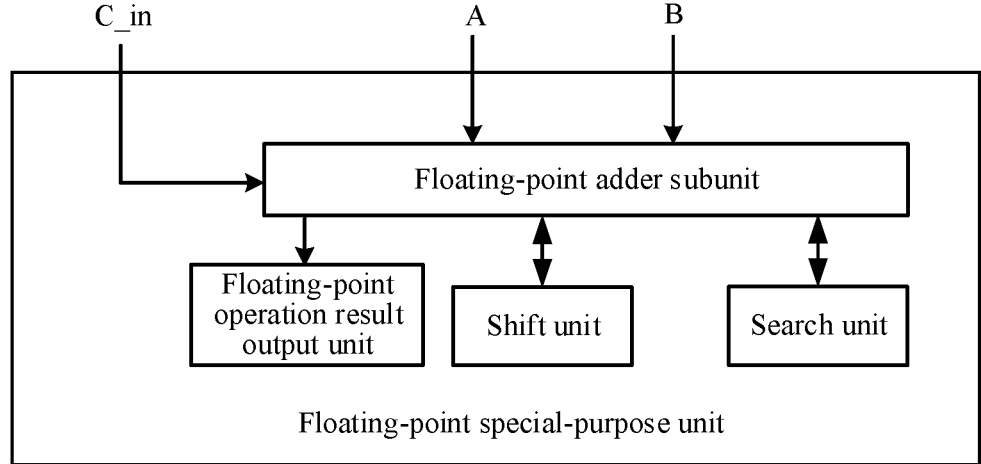
FIG. 4G is a schematic structural diagram of a floating-point special-purpose unit according to an embodiment of this application.

In another implementation, for a specific structure of the floating-point special-purpose unit 42 in the multiply accumulate module, reference may further be made to FIG. 4G. Specifically, the floating-point special-purpose unit 42 may include a floating-point adder subunit, a shift unit, a search unit, and a floating-point operation result output unit. An input end of the floating-point adder subunit is respectively connected to the first input end A, the second input end B, the upper-level input end C_in, the output end of the fixed-point adder subunit, the shift unit, and the search unit, an input end of the shift unit is connected to an output end of the floating-point adder subunit, an input end of the search unit is connected to the output end of the floating-point adder subunit, an input end of the floating-point operation result output unit is connected to the output end of the floating-point adder subunit, and an output end of the floating-point operation result output unit is connected to the output selection unit.

Figure 4H:
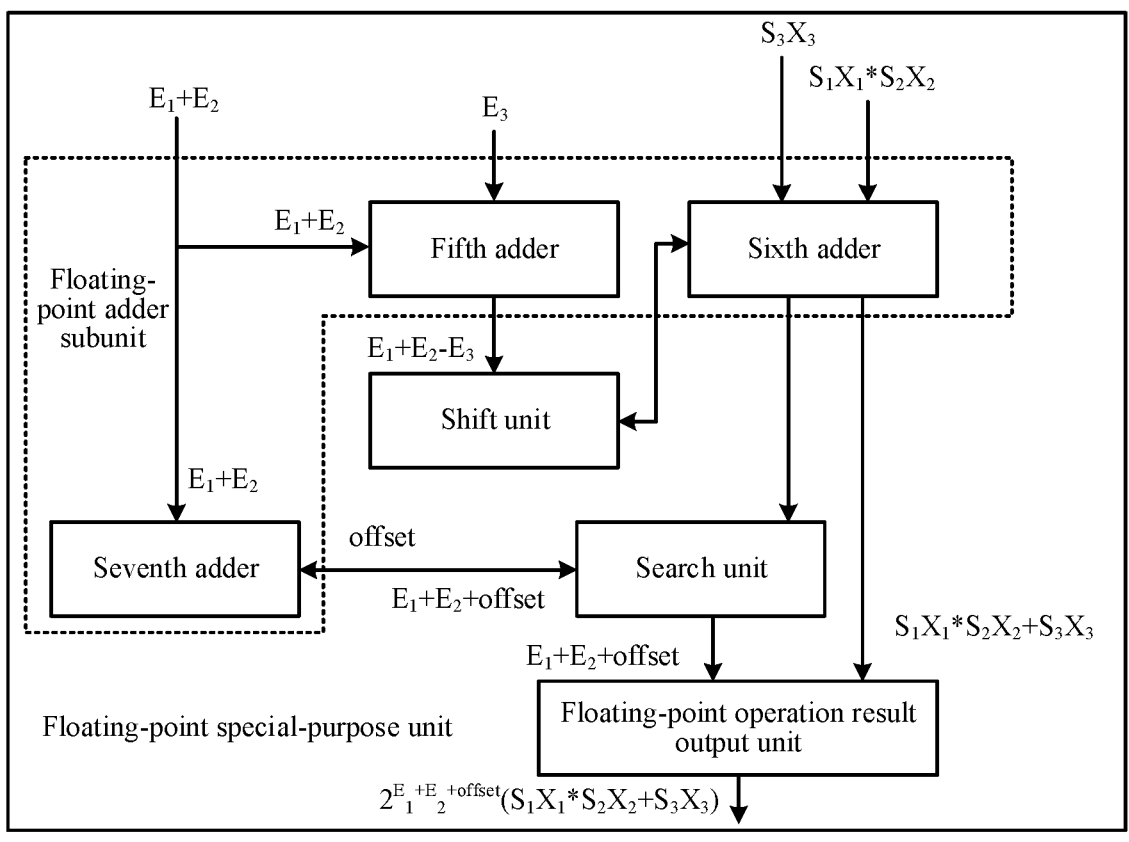
FIG. 4H is a schematic structural diagram of another floating-point special-purpose unit according to an embodiment of this application.

Further, the floating-point adder subunit may include: a fifth adder, a sixth adder, and a seventh adder. Correspondingly, for a connection relationship among parts of the floating-point special-purpose unit 42, reference may be made to FIG. 4H. Details are as follows.

An input end of the fifth adder is respectively connected to an output end of the fixed-point general-purpose unit 41 and the upper-level input end C_in. An input end of the sixth adder is respectively connected to the fixed-point output end of the fixed-point general-purpose unit 41, the upper-level input end C_in, and an output end of the shift unit. An input end of the seventh adder is respectively connected to the output end of the fixed-point general-purpose unit 41 and an output end of the search unit. An input end of the shift unit is respectively connected to an output end of the fifth adder and an output end of the sixth adder. An input end of the search unit is respectively connected to an output end of the sixth adder and an output end of the seventh adder. The floating-point operation result output unit is respectively connected to the output end of the sixth adder and the output end of the search unit.

During actual calculation, when the arithmetic mode is the floating-point arithmetic mode, a calculation formula used by the floating-point special-purpose unit 42 for performing a floating-point operation is as follows:

$$S2^E X = S_1 2^{E_1}.X_1 * S_2 2^{E_2}.X_2 + S_3 2^{E_3}.X_3 = 2^{E_1 + E_2 + offset}$$
$$(S_1X_1 * S_2X_2 + S_3X_3)$$

where $S_1 2^{E_1}.X_1$ is two-dimensional data, $S_2 2^{E_2}.X_2$ is a weight value, and $S_3 2^{E_3}.X_3$ is an intermediate accumulated result. That is, $E_1$ is an exponent part of the two-dimensional data, $E_2$ is an exponent part of the weight value, and $E_3$ is an exponent part of the intermediate accumulated result. $S_1$ is a sign bit of the two-dimensional data, $S_2$ is a sign bit of the weight value, and $S_3$ is a sign bit of the intermediate accumulated result. $X_1$ is a decimal part of the two-dimensional data, $X_2$ is a decimal part of the weight value, and $X_3$ is a decimal part of the intermediate accumulated result. offset is a relative offset value of an exponent due to carry of a decimal result obtained through calculation.

The foregoing operation process is performed by a corresponding calculation unit of the floating-point special-purpose unit 42, and a corresponding calculation execution process is as follows:

The fifth adder is configured to add the first exponential sum $E_1+E_2$ and a negative value of the exponent part $E_3$ of the intermediate accumulated result, to obtain a second exponential sum $E_1+E_2-E_3$.

The shift unit is configured to obtain a shift object and a shift bit number according to the second exponential sum $E_1+E_2-E_3$, the shift object being the first intermediate result $S_1X_1*S_2X_2$ or a decimal part $S_3X_3$ of the intermediate accumulated result; shift the first intermediate result $S_1X_1*S_2X_2$ according to the shift bit number when the shift object is the first intermediate result $S_1X_1*S_2X_2$, to obtain a shifted first intermediate result; and shift the decimal part $S_3X_3$ of the intermediate accumulated result according to the shift bit number when the shift object is the decimal part $S_3X_3$ of the intermediate accumulated result, to obtain a shifted decimal part of the intermediate accumulated result.

The sixth adder is configured to add the shifted first intermediate result and the decimal part $S_3X_3$ of the intermediate accumulated result when the shift object is the first intermediate result $S_1X_1*S_2X_2$; or add the first intermediate result $S_1X_1*S_2X_2$ and the shifted decimal part of the intermediate accumulated result when the shift object is the decimal part $S_3X_3$ of the intermediate accumulated result, to obtain a decimal sum.

The search unit is configured to obtain, according to the decimal sum, a decimal result $S_1X_1*S_2X_2+S_3X_3$ and a relative offset value offset of an exponent obtained through calculation, and obtain an exponent result $E_1+E_2+$offset of the floating-point operation result from the seventh adder.

The seventh adder is configured to add the relative offset value offset of the exponent and the first exponential sum $E_1+E_2$, to obtain the exponent result $E_1+E_2+$offset of the floating-point operation result.

The floating-point operation result output unit is configured to determine a sign bit of the floating-point operation result according to a sign bit of the decimal sum; and splice the sign bit of the floating-point operation result, the decimal result $S_1X_1*S_2X_2+S_3X_3$, and the exponent result $E_1+E_2+$offset together, to generate the floating-point operation result.

Based on the foregoing, FIG. 4E to FIG. 4H respectively exemplarily show the specific structures of the fixed-point general-purpose unit 41 and the floating-point special-purpose unit 42 in the multiply accumulate module shown in FIG. 4D. In an exemplary embodiment, a bit width occupied by the two-dimensional data and/or the weight value inputted into the multiply accumulate module may not be adapted to a bit width supported by the multiply accumulate module. Therefore, a data recombiner may further be deployed in the multiply accumulate module, to recombine and/or split the two-dimensional data and/or the weight value. Specifically, it is assumed that the bit width occupied by the two-dimensional data (or the weight value) is $2^R$ and the bit width supported by the multiply accumulate module is r. If the bit width occupied by the two-dimensional data (or the weight value) is greater than the bit width supported by the multiply accumulate module, the two-dimensional data (or the weight value) may be split into $2^R/r$ groups, so that a bit width occupied by each group of split data is r. If the bit width occupied by the two-dimensional data (or the weight value) is less than the bit width supported by the multiply accumulate module, the two-dimensional data (or the weight value) may be recombined, so that a bit width occupied by each group of recombined data is r.

Figure 4I:
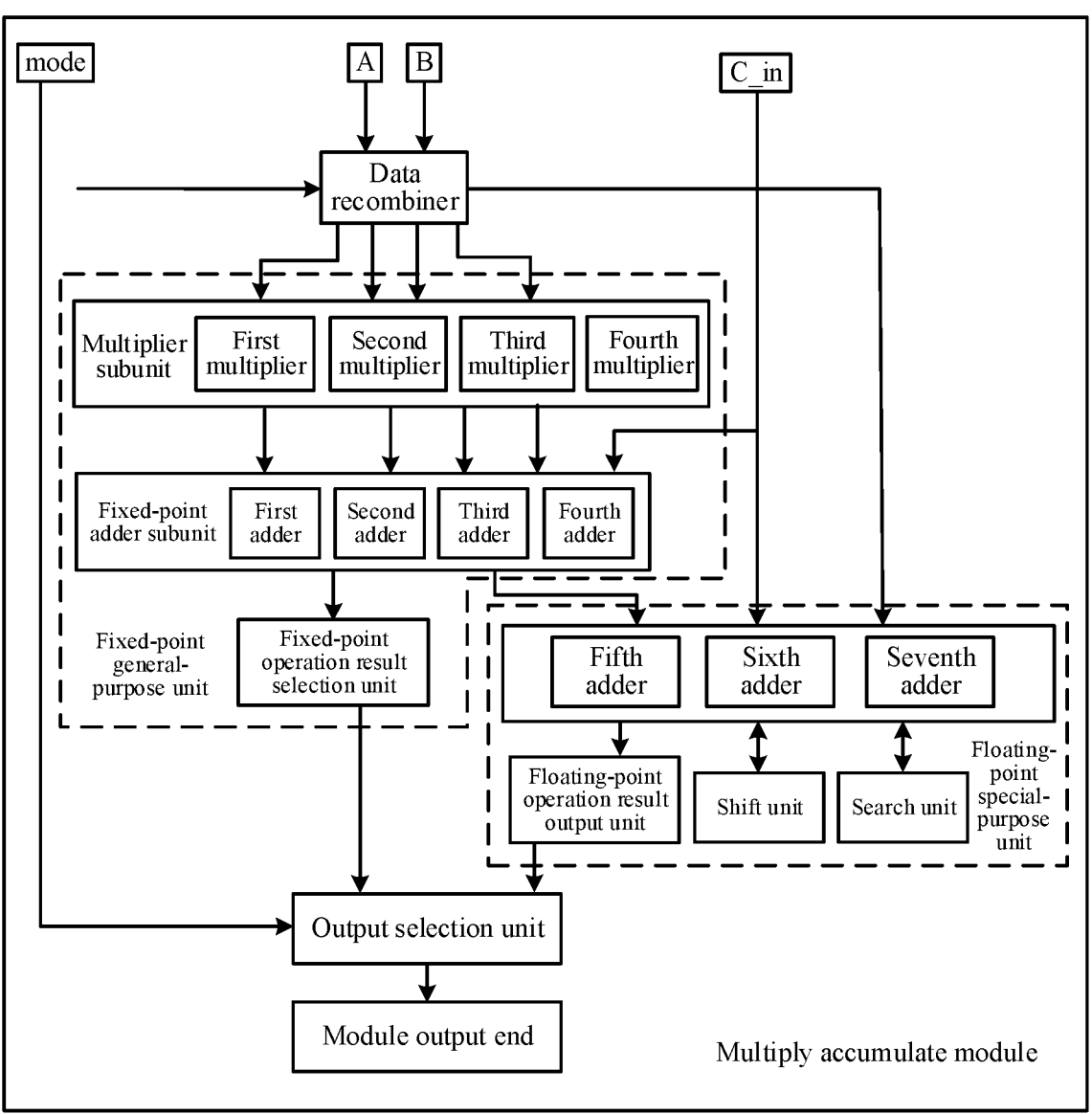
FIG. 4I is a schematic structural diagram of a multiply accumulate module according to an embodiment of this application.

Based on this, an embodiment of this application further provides a multiply accumulate module shown in FIG. 4I. Specifically, the multiply accumulate module may include a first input end A, a second input end B, an upper-level input end C_in, a module output end C_out, a mode selection end mode, a fixed-point general-purpose unit, a floating-point special-purpose unit, an output selection unit, and a data recombiner.

The fixed-point general-purpose unit includes a multiplier subunit, an adder subunit, and a fixed-point operation result selection unit. An input end of the multiplier subunit is connected to the data recombiner, an input end of the adder subunit is respectively connected to an output end of the multiplier subunit and the upper-level input end C_in, an input end of the fixed-point operation result selection unit is connected to an output end of the adder subunit, and an output end of the fixed-point operation result selection unit is connected to the output selection unit.

The floating-point special-purpose unit includes a floating-point adder subunit, a shift unit, a search unit, and a floating-point operation result output unit. An input end of the floating-point adder subunit is respectively connected to the data recombiner, the upper-level input end C_in, the output end of the adder subunit, the shift unit, and the search unit, an input end of the shift unit is connected to an output end of the floating-point adder subunit, an input end of the search unit is connected to the output end of the floating-point adder subunit, an input end of the floating-point operation result output unit is connected to the output end of the floating-point adder subunit, and an output end of the floating-point operation result output unit is connected to the output selection unit.

In this embodiment of this application, by configuring the fixed-point general-purpose unit and the floating-point special-purpose unit in the multiply accumulate module, the floating-point special-purpose unit is connected to the fixed-point output end of the fixed-point general-purpose unit. The fixed-point general-purpose unit completes the multiply accumulate calculation in the fixed-point arithmetic mode, and the fixed-point general-purpose unit and the floating-point special-purpose unit cooperate to complete the multiply accumulate calculation in the floating-point arithmetic mode, so that the same multiply accumulate module can implement both the fixed-point multiply accumulate operation and the floating-point multiply accumulate operation. Because the fixed-point operation unit and the floating-point operation unit are integrated in one circuit, and share some devices, a total quantity of devices used is reduced, thereby reducing an area occupied by the fixed-point operation unit and the floating-point operation unit on the convolution computation engine, and reducing power consumption of the convolution computation engine during multiply accumulate operation.

Figure 5:
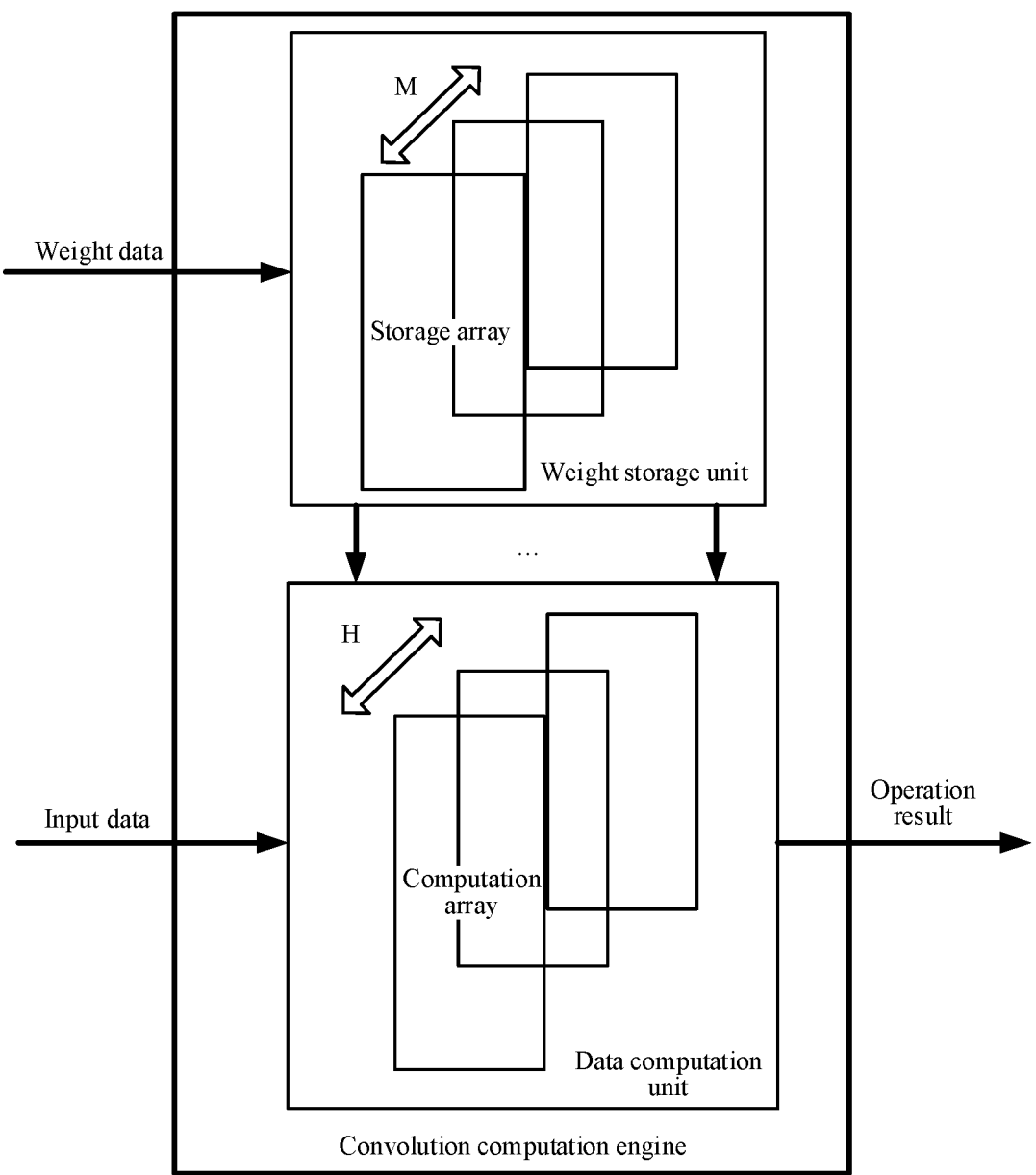
FIG. 5 is a schematic structural diagram of a convolution computation engine according to another embodiment of this application.

Based on the above descriptions, when the convolution computation engine is actually manufactured, M storage arrays may be deployed in the weight storage unit, and H computation arrays may be deployed in the data computation unit. In this case, a schematic structural diagram of a convolution computation engine may refer to FIG. 5. Alternatively, M storage arrays may be deployed in only the weight storage unit. Alternatively, H computation arrays may be deployed in only the data computation unit. In an actual application, the convolution computation engine may be integrated in hardware such as a central processing unit (CPU), a field programmable gate array (FPGA), an application-specific integrated circuit (ASIC), a graphics processing unit (GPU), or an artificial intelligence (AI) chip. The chip is a silicon chip including an integrated circuit. The chip generally has a relatively small volume and is an important part of a computer or another electronic device.

Figure 6:
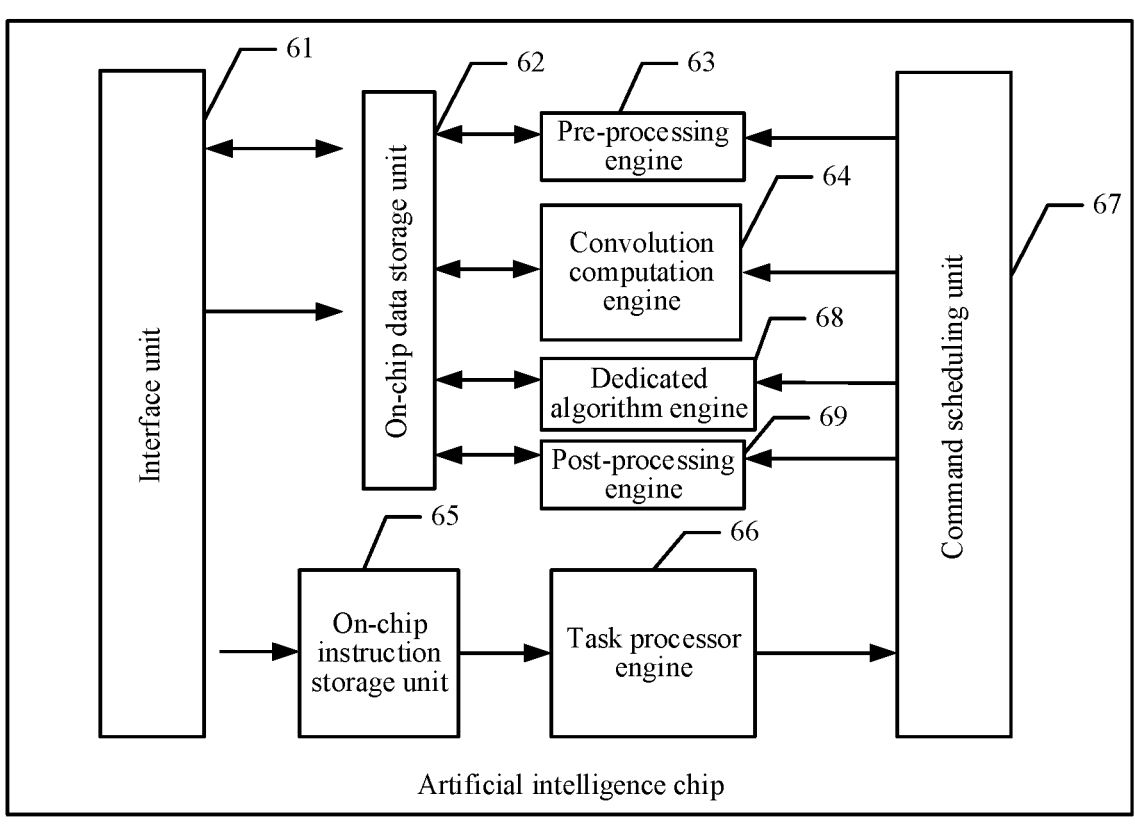
FIG. 6 is a schematic structural diagram of an artificial intelligence chip according to an embodiment of this application.

Based on this, an embodiment of this application further provides an AI chip. The AI chip includes the convolution computation engine of the neural network model. In some embodiments, the AI chip may further include another interface and another engine. For example, as shown in FIG. 6, the AI chip may further include an interface unit 61, an on-chip data storage unit 62, a preprocessing engine 63, a convolution computation engine 64, an on-chip instruction storage unit 65, a task processor engine 66, a command scheduling unit 67, a dedicated algorithm engine 68, a post-processing engine 69, and the like.

One end of the on-chip data storage unit 62 is connected to the interface unit 61. Another end of the on-chip data storage unit 62 is respectively connected to one end of the preprocessing engine 63, one end of the convolution computation engine 64, one end of the dedicated algorithm engine 68, and one end of the post-processing engine 69. Another end of the preprocessing engine 63, another end of the convolution computation engine 64, another end of the dedicated algorithm engine 68, and another end of the post-processing engine 69 are respectively connected to an output end of the command scheduling unit 67. An input end of the command scheduling unit 67 is connected to an output end of the task processor engine 66, and an input end of the task processor engine 66 is connected to an output end of the on-chip instruction storage unit 65. An input end of the on-chip instruction storage unit 65 is connected to an output end of the interface unit 61.

In a specific implementation, the interface unit 61 may be configured to obtain input data of a neural network model and weight data of network layers and write the obtained input data of the neural network model and the weight data of the network layers into the on-chip data storage unit 62. The input data of the neural network model may include, but not limited to, image data, text data, language data, and the like. The input data of the neural network model and the weight data of the network layers may be obtained by the interface unit 61 from a cloud side host (for example, a cloud server) by using a peripheral component interconnect express (PCIe) bus or another bus.

The on-chip data storage unit 62 may further buffer operation result data of the network layers in the neural network model in addition to storing the input data of the neural network model and the weight data of the network layers. In some embodiments, the operation result data of the network layers in the neural network model may alternatively be buffered to an off-chip storage unit (for example, a double data rate (DDR) synchronous dynamic random access memory) outside the AI chip.

The preprocessing engine 63 is configured to pre-process the data, for example, data filtering, image data size scaling, and image data cutting.

The convolution computation engine 64 is configured to respectively perform a convolution operation on input data of the network layers by using the weight data of the network layers in the neural network model. For details, reference may be made to the related descriptions in the foregoing embodiments.

The on-chip instruction storage unit 65 is configured to store instructions such as a data preprocessing instruction and a convolution operation instruction involved in a calculation process of the neural network model.

The task processor engine 66 is configured to load and execute the instructions.

The command scheduling unit 67 is configured to control a related engine to perform data processing, for example, control the preprocessing engine 63 to preprocess the data.

The dedicated algorithm engine 68 is configured to process the data by using a dedicated algorithm. The dedicated algorithm may include, but not limited to, image compression and decompression algorithms, an image format conversion algorithm, a video or audio processing algorithm, and the like.

The post-processing engine 69 is configured to perform an operation such as a pooling operation other than the convolution operation in the neural network model.

In this embodiment of this application, parallel processing of the convolution operation and the weight data loading in the neural network model may be implemented by disposing the high-performance convolution computation engine in the AI chip, to hide the loading duration of the weight data. In this way, the entire computation time consumed by the convolution computation engine may be effectively reduced, and the computation performance of the convolution computation engine is improved. In addition, the convolution computation engine has a relatively high integration degree, to reduce the area occupied by a chip of the convolution computation engine, thereby reducing an area and power consumption of the entire AI chip.

Figure 7:
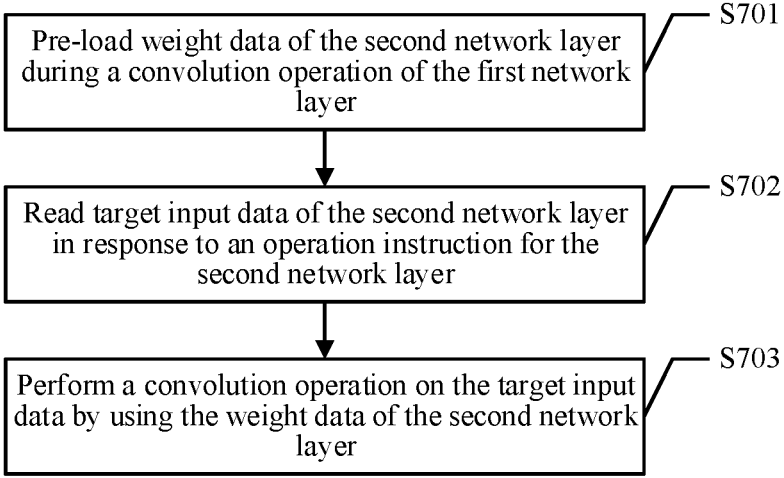
FIG. 7 is a schematic flowchart of a data processing method according to an embodiment of this application.

Based on the foregoing related descriptions of the convolution computation engine of the neural network model, an embodiment of this application further provides a data processing method, and the data processing method may be performed by the mentioned convolution computation engine. The neural network model includes at least a first network layer and a second network layer. Referring to FIG. 7, the data processing method may include the following steps S701 to S703:

S701. Pre-load weight data of the second network layer during a convolution operation of the first network layer.

S702. Read target input data of the second network layer in response to an operation instruction for the second network layer.

S703. Perform the convolution operation on the target input data by using the weight data of the second network layer.

In this embodiment of this application, by performing operations of the convolution operation and the weight data loading in parallel, a loading duration of the weight data may be hidden. In this way, the entire computation time consumed by the convolution computation engine may be effectively reduced, and data processing efficiency is improved.

Based on the descriptions of the foregoing embodiments, an embodiment of this application further provides a processing device. The processing device may be a terminal or a server. The terminal may include, but not limited to, a smartphone, a tablet computer, a laptop computer, a desktop computer, or the like. The server may be an independent physical server, or may be a server cluster formed by a plurality of physical servers or a distribute system, or may be a cloud server providing basic cloud computing services such as cloud services, a cloud database, cloud computing, a cloud function, cloud storage, network services, cloud communication, middleware services, domain name services, security services, content delivery network (CDN), big data and AI platforms.

Figure 8:
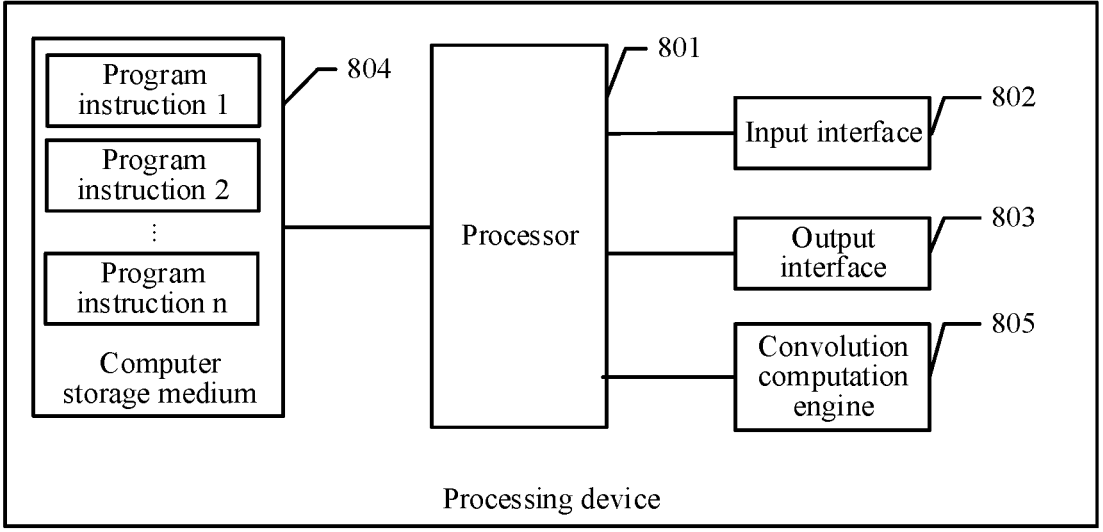
FIG. 8 is a schematic structural diagram of a processing device according to an embodiment of this application.

Referring to FIG. 8, the processing device includes at least a processor 801, an input interface 802, an output interface 803, a computer storage medium 804, and the convolution computation engine 805. The computer storage medium 804 may be stored in a memory of the processing device. The computer storage medium 804 is configured to store a computer program. The computer program includes program instructions. The processor 801 is configured to execute the program instructions stored in the computer storage medium 804. The processor 801 (or referred to as a CPU) is a computing core and a control core of the processing device, is suitable for implementing one or more instructions, and is specifically suitable for loading and executing one or more instructions to control the convolution computation engine to implement a corresponding method procedure or a corresponding function. In an embodiment, the processor 801 described in this embodiment of this application may invoke a series of instructions to control the convolution computation engine to perform a series of data processing, including: pre-loading weight data of a second network layer during a convolution operation of a first network layer; reading target input data of the second network layer in response to an operation instruction for the second network layer; and performing the convolution operation on the target input data by using the weight data of the second network layer.

An embodiment of this application further provides a computer storage medium (a memory), and the computer storage medium being a memory device in the processing device and being configured to store programs and data. It may be understood that the computer storage medium herein may include an internal storage medium of the processing device and certainly may also include an extended storage medium supported by the processing device. The computer storage medium provides storage space, and the storage space stores an operating system of the processing device. In addition, the storage space further stores one or more instructions adapted to be loaded and executed by the processor 801. The instructions may be one or more computer programs (including program code). The computer storage medium herein may be a high-speed RAM memory, or may be a non-volatile memory such as at least one magnetic disk storage. In some embodiments, the computer storage medium may be at least one computer storage medium far away from the processor. Specifically, the processor 801 may load and execute one or more instructions stored in the computer storage medium 804, to control the convolution computation engine to implement corresponding steps of the embodiments of the data processing method shown in FIG. 7.

According to an aspect of the embodiments of this application, a computer program product or a computer program is further provided, the computer program product or the computer program including computer instructions, the computer instructions being stored in a computer-readable storage medium. The processor of the computer device reads the computer instructions from the computer-readable storage medium, and the processor executes the computer instructions, to cause the computer device to perform the steps of the foregoing embodiments of the data processing method shown in FIG. 7.

In this embodiment of this application, by performing operations of the convolution operation and the weight data loading in parallel, a loading duration of the weight data may be hidden. In this way, the entire computation time consumed by the convolution computation engine may be effectively reduced, and the data processing efficiency is improved.

What is disclosed above is merely exemplary embodiments of this application, and certainly is not intended to limit the scope of the claims of this application. Therefore, equivalent variations made in accordance with the claims of this application shall fall within the scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A convolution computation engine including a processor and a non-transitory memory, the convolution computation engine comprising:

a weight storage unit implemented on the processor and a data computation unit implemented on the processor, wherein:

an output end of the weight storage unit is connected to an input end of the data computation unit, the weight storage unit is configured to pre-load weight data of a second network layer of a neural network model from an external storage unit during a convolution operation of a first network layer of the neural network model, the data computation unit is configured to:

obtain target input data of the second network layer in response to an operation instruction for the second network layer, read the weight data of the second network layer from the weight storage unit, and perform a convolution operation on the target input data by using the weight data of the second network layer, the target input data is split into a plurality of slices of data according to a size of a convolution kernel corresponding to a weight value in the weight data, a size of each piece of data is less than or equal to the size of the convolution kernel corresponding to the weight value, the data computation unit comprises H computation arrays, H being a positive integer, some or all computation arrays of the H computation arrays perform convolution calculation on the plurality of slices of data in parallel, one computation array corresponding to one slice of data, an $h^{th}$ computation array is configured to obtain a target slice of data of the target input data of the second network layer in response to the operation instruction for the second network layer, read the weight data of the second network layer from the weight storage unit, and perform the convolution operation on the target slice of data by using the weight data of the second network layer, $h \in [1, H]$, the target slice of data being any slice of data in the target input data on which the convolution operation is not performed.

2. The convolution computation engine according to claim 1, wherein:

the weight data of the second network layer comprises weight values of N convolution kernels, N being a positive integer, the weight storage unit comprises a decoder module and M storage arrays, M being a positive integer, an output end of the decoder module is respectively connected to input ends of the storage arrays, and the decoder module is configured to perform weight value read and write operations on the M storage arrays, each of the storage arrays being an array obtained by arranging a plurality of storage units in a form of a matrix.

3. The convolution computation engine according to claim 2, wherein the decoder module is configured to:

obtain the weight data of the second network layer from the external storage unit during the convolution operation of the first network layer, determine storage addresses of the weight values in the weight data of the second network layer in the M storage arrays, and respectively write the weight values into the M storage arrays in sequence according to the storage addresses of the weight values.

4. The convolution computation engine according to claim 2, wherein the decoder module is configured to:

obtain storage addresses of the weight values in the weight data of the second network layer in the M storage arrays in response to a weight read instruction of the second network layer, respectively read the weight values from the M storage arrays according to the storage addresses of the weight values, and transmit the read weight values into the data computation unit.

5. The convolution computation engine according to claim 4, wherein:

the decoder module comprises: a first decoder, a second decoder, and an access controller, an input end of the second decoder is connected to an output end of the first decoder, an output end of the second decoder is connected to the access controller, the first decoder is configured to decode array identifiers of the storage arrays, the second decoder is configured to decode storage coordinates of the storage units in the storage arrays, and the access controller is configured to generate access timing of the M storage arrays.

6. The convolution computation engine according to claim 5, wherein the access timing comprises at least one of the following: initialization timing, read and write control and switch timing, write timing, read timing, or error processing timing.

7. The convolution computation engine according to claim 5, wherein:

the second decoder comprises: a column decoder and a row decoder, the column decoder is configured to decode column coordinates in the storage coordinates of the storage units in the storage arrays, and the row decoder is configured to decode row coordinates in the storage coordinates of the storage units in the storage arrays.

8. The convolution computation engine according to claim 5, wherein a storage address of a target weight value in an $n^{th}$ convolution kernel in the weight data in the M storage arrays comprises an array identifier of a target storage array configured to store the target weight value and storage coordinates of a target storage unit configured to store the target weight value in the target storage array, $n\in[1, N]$, and the target weight value being any weight value in the $n^{th}$ convolution kernel.

9. The convolution computation engine according to claim 8, wherein:

the first decoder is configured to select the target storage array configured to store the target weight value from the M storage arrays and determine the array identifier of the target storage array, the second decoder is configured to select the target storage unit configured to store the target weight value from the target storage array and determine the storage coordinates of the target storage unit, and the access controller is configured to obtain the target weight value from the external storage unit during the convolution operation of the first network layer, and write the target weight value into the target storage unit in the target storage array according to the array identifier corresponding to the target weight value and the storage coordinates corresponding to the target weight value.

10. The convolution computation engine according to claim 5, wherein a storage address of a target weight value in an $n^{th}$ convolution kernel in the weight data in the M storage arrays comprises an array identifier of a target storage array configured to store the target weight value and storage coordinates of a target storage unit configured to store the target weight value in the target storage array, $n\in[1, N]$, and the target weight value being any weight value in the $n^{th}$ convolution kernel.

11. The convolution computation engine according to claim 10, wherein:

the first decoder is configured to decode the storage address corresponding to the target weight value in response to the weight read instruction of the second network layer, to obtain the array identifier of the target storage array configured to store the target weight value, the second decoder is configured to decode the storage address corresponding to the target weight value, to obtain the storage coordinates of the target storage unit configured to store the target weight value in the target storage array, and the access controller is configured to determine the target storage array from the M storage arrays according to the array identifier corresponding to the target weight value, read the target weight value from the target storage unit in the target storage array according to the storage coordinates corresponding to the target weight value, and transmit the read target weight value into the data computation unit.

12. The convolution computation engine according to claim 8, wherein after reading the target weight value from the target storage array, the access controller is further configured to: perform error processing on the read target weight value when the read target weight value is abnormal, the error processing meaning that data correction is performed on the read target weight value by using a parity bit corresponding to the target weight value, and the parity bit corresponding to the target weight value being generated when the target weight value is written into the target storage array.

13. The convolution computation engine according to claim 10, wherein:

the $h^{th}$ computation array is an array of P rows and Q columns formed by P*Q multiply accumulate modules, both P and Q being positive integers, each of the multiply accumulate modules comprises: a first input end, a second input end, an upper-level input end, and a module output end, a module output end of a multiply accumulate module in a $p^{th}$ row and a $q^{th}$ column is connected to an upper-level input end of a multiply accumulate module in a $(p+1)^{th}$ row and the $q^{th}$ column, $p \in [1, P-1]$ and $q \in [1, Q]$, the target slice of data is divided into a plurality of pieces of two-dimensional data according to a depth of the target slice of data, and any two-dimensional data is inputted into first input ends of multiply accumulate modules in any row in the $h^{th}$ computation array in a broadcast manner, the weight data of the second network layer comprises weight values of N convolution kernels, N being a positive integer and N being less than or equal to Q, and a weight value of an $n^{th}$ convolution kernel is inputted into second input ends of multiply accumulate modules in an $n^{th}$ column in the $h^{th}$ computation array.

14. The convolution computation engine according to claim 13, wherein each of the multiply accumulate modules further comprises: a mode selection end configured to select a fixed-point arithmetic mode or a floating-point arithmetic mode, a fixed-point general-purpose unit, a floating-point special-purpose unit, and an output selection unit.

15. The convolution computation engine according to claim 14, wherein:

the fixed-point general-purpose unit is respectively connected to the first input end, the second input end, the upper-level input end, and the mode selection end of each of the multiply accumulate modules, a fixed-point output end of the fixed-point general-purpose unit is respectively connected to the output selection unit and the floating-point special-purpose unit, the floating-point special-purpose unit is respectively connected to the first input end, the second input end, the upper-level input end, the fixed-point output end, and the mode selection end of each of the multiply accumulate modules, a floating-point output end of the floating-point special-purpose unit is connected to the output selection unit, and the output selection unit is configured to connect the fixed-point output end to the module output end when an arithmetic mode indicated by the mode selection end is the fixed-point arithmetic mode, and connect the floating-point output end to the module output end when the arithmetic mode is the floating-point arithmetic mode.

16. The convolution computation engine according to claim 1, wherein the convolution computation engine is integrated into one of a central processing unit, a field programmable gate array, an application-specific integrated circuit, a graphics processing unit, or an artificial intelligence chip.

17. The convolution computation engine according to claim 1, the weight storage unit being implemented by a first processing circuit, the data computation unit being implemented by a second processing circuit, and the first processing circuit and the second processing circuit being independent of each other.

18. A data processing method performed by the convolution computation engine according to claim 1, and the data processing method comprising:

pre-loading weight data of the second network layer during a convolution operation of the first network layer, reading target input data of the second network layer in response to an operation instruction for the second network layer, and performing a convolution operation on the target input data by using the weight data of the second network layer.

19. An artificial intelligence chip, comprising the convolution computation engine of the neural network model according to claim 1.

* * * * *